US012624216B2

(12) United States Patent
De Miguel et al.

(10) Patent No.: US 12,624,216 B2
(45) Date of Patent: May 12, 2026

(54) METHOD FOR THE PRODUCTION OF FREE-FLOWING GRANULES

(71) Applicant: Omya International AG, Oftringen (CH)

(72) Inventors: Laura De Miguel, Zofingen (CH); Marc Maurer, Village-Neuf (FR); Alain Cremaschi, Saint Germain la Ville (FR); Francine Karl, Compertrix (FR); Iñigo Sesma Pardo, Barcelona (ES); Gaëlle Mohler, Oftringen (CH); Javier Camargo, Hésingue (FR); Lalit Sharma, Zofingen (CH); Wolfgang Höpfl, Schwörstadt (DE)

(73) Assignee: Omya International AG, Oftringen (CH)

( * ) Notice: Subject to any disclaimer, the term of this patent is extended or adjusted under 35 U.S.C. 154(b) by 683 days.

(21) Appl. No.: 17/995,759

(22) PCT Filed: Apr. 26, 2021

(86) PCT No.: PCT/EP2021/060793
§ 371 (c)(1),
(2) Date: Oct. 7, 2022

(87) PCT Pub. No.: WO2021/219529
PCT Pub. Date: Nov. 4, 2021

(65) Prior Publication Data
US 2023/0174786 A1 Jun. 8, 2023

(30) Foreign Application Priority Data

Apr. 28, 2020 (EP) .................................... 20171934
Jul. 7, 2020 (EP) .................................... 20184509
Oct. 30, 2020 (EP) .................................... 20204917

(51) Int. Cl.
*C09C 1/02* (2006.01)
*C01F 11/18* (2006.01)

(52) U.S. Cl.
CPC .............. *C09C 1/021* (2013.01); *C01F 11/18* (2013.01); *C01P 2004/03* (2013.01); *C01P 2004/32* (2013.01); *C01P 2004/51* (2013.01); *C01P 2004/61* (2013.01); *C01P 2004/62* (2013.01); *C01P 2006/12* (2013.01); *C01P 2006/14* (2013.01)

(58) Field of Classification Search
CPC ......... C09C 1/021; C09C 1/022; C09C 1/024; C01F 11/18; C01P 2004/03
See application file for complete search history.

(56) References Cited

U.S. PATENT DOCUMENTS

| | | | |
|---|---|---|---|
| 3,992,314 A | 11/1976 | Cherney | |
| 4,985,459 A | 1/1991 | Sunshine et al. | |
| 2003/0099741 A1 | 5/2003 | Gubler | |
| 2003/0157213 A1 | 8/2003 | Jenkins | |
| 2003/0206993 A1 | 11/2003 | Gubler | |
| 2004/0020410 A1 | 2/2004 | Gane et al. | |
| 2012/0186492 A1* | 7/2012 | Gane ...................... | C09C 1/022 |
| | | | 524/400 |

FOREIGN PATENT DOCUMENTS

| | | | |
|---|---|---|---|
| EP | 1974806 A1 | 10/2008 | |
| EP | 1974807 B1 | 3/2010 | |
| EP | 2264108 A1 | 12/2010 | |
| EP | 2264109 A1 | 12/2010 | |
| EP | 1982759 B1 | 9/2011 | |
| EP | 1975310 B1 | 12/2011 | |
| EP | 2719376 B1 | 3/2015 | |
| EP | 2662419 B1 | 7/2015 | |
| EP | 2589430 B1 | 9/2015 | |
| EP | 2719373 B1 | 4/2017 | |
| EP | 3260114 A1 | 12/2017 | |
| EP | 3260115 A1 | 12/2017 | |
| EP | 2949708 B1 | 4/2018 | |
| EP | 3192837 B1 | 3/2020 | |
| EP | 3622966 A1 | 3/2020 | |
| WO | 0039222 A1 | 7/2000 | |
| WO | 2004083316 A1 | 9/2004 | |
| WO | 2005121257 A2 | 12/2005 | |
| WO | 2009074492 A1 | 6/2009 | |
| WO | 2010037753 A1 | 4/2010 | |
| WO | 2010146530 A1 | 12/2010 | |

OTHER PUBLICATIONS

Gane et al., "Void Space Structure of Compressible Polymer Spheres and Consolidated Calcium Carbonate Paper-Coating Formulations", Industrial & Engineering Chemistry Research, vol. 35, No. 5, pp. 1753-1765. 1996.
International Search Report and Written Opinion in International Application No. PCT/EP2021/060793, 12 pages. Jun. 25, 2021.

* cited by examiner

*Primary Examiner* — Pegah Parvini
(74) *Attorney, Agent, or Firm* — Heslin Rothenberg Farley & Mesiti P.C.

(57) ABSTRACT
The present invention refers to a method for the production of granules comprising surface-reacted calcium carbonate, granules comprising a surface-reacted calcium carbonate having a bulk density ranging from 0.25 to 0.70 g/mL, preferably from 0.28 to 0.65 g/mL, more preferably from 0.30 to 0.60 g/mL, and most preferably from 0.35 to 0.60 g/mL and the use of the granules n a nutraceutical product, agricultural product, veterinary product, cosmetic product, preferably in a dry cosmetic and/or dry skin care composition, home product, food product, packaging product or personal care product, preferably in an oral care composition, or as excipient in a pharmaceutical product.

7 Claims, 5 Drawing Sheets

Mag = 500 X      20 µm          EHT = 5.00 kV      Photo No. = 43
mic19_11077    |——|        WD = 5.0 mm      Signal A = SE2

Mag = 100 X      100µm          EHT = 5.00 kV      Photo No. = 33
mic19_10759    |——|        WD = 5.0 mm      Signal A = SE2

Mag = 500 X     20 µm          EHT = 5.00 kV     Photo No. = 49
mic19_11054    ⊢——⊣          WD = 5.0 mm      Signal A = SE2

Mag = 500 X     20 µm          EHT = 5.00 kV     Photo No. = 55
mic19_11093    ⊢——⊣          WD = 5.0 mm      Signal A = SE2

Mag = 500 X      20 μm        EHT = 15.00 kV    Photo No. = 57
mic19_ 12960   ⊢——⊣        WD = 8,5 mm      Signal A = NTS BSD Mag = 2.50 K X   10 μm        EHT =   2.00 kV    Photo No. = 5
                ⊢————————⊣  WD = 5.0 mm      Signal A = SE2

Mag = 100 X    100 μm          EHT =  2.00 kV    Photo No. = 41
          ⊢——⊣               WD = 5.0 mm      Signal A = SE2

METHOD FOR THE PRODUCTION OF FREE-FLOWING GRANULES

CROSS REFERENCE TO RELATED APPLICATIONS

This application is a U.S. National Phase filing under 35 U.S.C. § 371 of International Application PCT/EP2021/060793, filed on Apr. 26, 2021, and published as WO 2021/219529 A1 on Nov. 4, 2021. PCT/EP2021/060793 claims priority from European application number 20171934.1, filed on Apr. 28, 2020, European application number 20184509.6 filed on Jul. 7, 2020, and European application number 20204917.7 filed on Oct. 30, 2020. The entire contents of each of these prior applications are hereby incorporated herein by reference.

The present invention refers to a method for the production of granules comprising surface-reacted calcium carbonate, granules comprising a surface-reacted calcium carbonate having a bulk density ranging from 0.25 to 0.70 g/mL, preferably from 0.28 to 0.65 g/mL, more preferably from 0.30 to 0.60 g/mL, and most preferably from 0.35 to 0.60 g/mL and the use of the granules in a nutraceutical product, agricultural product, veterinary product, cosmetic product, preferably in a dry cosmetic and/or dry skin care composition, home product, food product, packaging product or personal care product, preferably in an oral care composition, or as excipient in a pharmaceutical product.

In many applications such as pharmaceutical, nutraceutical, agricultural, veterinary, cosmetic, home, food, packaging and personal care product granules are of considerable importance and more preferred than powders. Thus, agglomeration of powders leading to granules typically having a size range between 0.2 to 4.0 mm depending on their subsequent use is widely used to improve physical properties of powders like wettability, flowability, bulk density and product appearance.

Furthermore, granulation is carried out, e.g. to prevent the segregation of the constituents of powder mixes, to prevent dusting or to improve flowability.

Granulation, i.e. the process in which the primary powder particles are made to adhere to form larger, multiparticle entities is a process of collecting particles together by creating bonds between them e.g. by a binding agent.

One of the most important types of granulation is wet granulation, wherein granules are formed by the addition of a granulation liquid onto a powder bed which is under the influence of an impeller. The agitation resulting in the system along with the wetting of the components within the formulation results in the agglomeration of the primary powder particles to produce wet granules. The granulation liquid contains a solvent which must be volatile so that it can be removed by drying, and be non-toxic. Water mixed into the powders can form bonds between powder particles that are strong enough to lock them together. However, once the water dries, the agglomerates may fall apart. Therefore, water may not be strong enough to create and hold a bond. In such instances, the granulation liquid includes a binder.

Regarding surface-reacted calcium carbonate, also granules are generally known. For example, in EP2264108 A1 (WO2010146530 A1), it is mentioned that the surface-reacted calcium carbonate obtained from the process described therein may be in the form of a cake, granules or a powder, and also in several documents describing different uses of surface-reacted calcium carbonate, such as in water purification, as a controlled release carrier, in fast disintegrating dosage forms, or gastroretentive drug formulation and delivery systems (EP1975310 B1, EP1982759 B1, EP1974807 B1, EP1974806 B1, EP2589430 A1, WO2010037753 A1, EP2719373 A1, or EP2719376 A1), granules are generally mentioned.

These granules, however, which are either obtained as a result of the basic process of producing surface-reacted calcium carbonate, or by (wet) granulation, suffer from several disadvantages, such as e.g. inferior bulk density, flow properties and compactability as well as low mechanical stability. Furthermore, wet granulation requires the use of a binder which is less advantageous.

Thus, surface-reacted calcium carbonate can be granulated using various methods, but the conventional processes, in the absence of binder, do not provide the desired result, i.e. high bulk density, flow properties and compactability as well as high mechanical stability.

Thus, it is the object of the present invention to provide a method for the production of granules comprising surface-reacted calcium carbonate having a high bulk density, flow properties and compactability as well as high mechanical stability. A further object of the present invention is to improve the aforementioned characteristics without the use of a binder.

One or more of the foregoing and other objects are solved by the subject-matter as defined herein in the independent claim. Advantageous embodiments of the present invention are defined in the corresponding sub-claims.

The present invention thus relates to a method for the production of granules comprising surface-reacted calcium carbonate, the method comprising the steps of a) providing an aqueous suspension comprising a surface-reacted calcium carbonate, wherein the surface-reacted calcium carbonate is a reaction product of natural ground or precipitated calcium carbonate with carbon dioxide and one or more acids, wherein the carbon dioxide is formed in situ by the acid treatment and/or is supplied from an external source;

b) homogenizing the aqueous suspension comprising a surface-reacted calcium carbonate of step a), and c) removing the liquid from the aqueous suspension comprising a surface-reacted calcium carbonate of step b) by means of spray drying for obtaining granules comprising surface-reacted calcium carbonate.

According to one embodiment, the natural ground calcium carbonate is selected from calcium carbonate containing minerals selected from the group comprising marble, chalk, limestone and mixtures thereof; and that the precipitated calcium carbonate is selected from the group comprising precipitated calcium carbonates having amorphous, aragonitic, vateritic or calcitic mineralogical crystal forms or mixtures thereof.

According to another embodiment, the surface-reacted calcium carbonate in the aqueous suspension of step a) has a) a volume median grain diameter $d_{50}$ of 0.5 to 50 μm, preferably from 0.7 to 25 μm, more preferably 0.8 to 20 μm, particularly 1 to 10 μm, measured by using laser diffraction, and/or b) a BET specific surface area of from 1 m²/g to 200 m²/g, preferably 2 m²/g to 150 m²/g, more preferably 20 m²/g to 140 m²/g, most preferably 40 m²/g to 70 m²/g, measured using nitrogen and the BET method according to ISO 9277:2010.

According to yet another embodiment, the aqueous suspension of step a) has a solids content in the range from 1 to 40 wt.-%, preferably from 5 to 35 wt.-%, and most preferably from 7 to 26 wt.-%, based on the total weight of the aqueous suspension.

According to one embodiment, at least one disintegrant is added before and/or during and/or after step b), preferably the at least one disintegrant is selected from the group comprising sodium croscarmellose, modified cellulose gums, insoluble cross-linked polyvinylpyrrolidones, starches, modified starches, starch glycolates such as sodium starch glycolate, micro crystalline cellulose, pregelatinized starch, sodium carboxymethyl starch, low-substituted hydroxypropyl cellulose, homopolymers of N-vinyl-2-pyr-rolidone, alkyl-, hydroxyalkyl-, carboxyalkyl-cellulose esters, alginic acid, microcrystalline cellulose and its poly-morphic forms, ion exchange resins, gums, chitin, chitosan, clays, gellan gum, crosslinked polacrilin copolymers, agar, gelatine, dextrines, acrylic acid polymers, carboxymethyl-cellulose sodium/calcium, hydroxypropyl methyl cellulose phthalate, shellac, effervescent mixtures such as bicarbon-ates in combination with one or more acids, e.g. citric acid or tartaric acid, or mixtures thereof.

According to another embodiment, the at least one dis-integrant is added before and/or during and/or after step b) in an amount ranging from 0.3 to 10 wt.-%, preferably from 0.5 to 8 wt.-%, more preferably from 1 to about 5 wt.-% based on the total dry weight of the surface-reacted calcium carbonate.

According to yet another embodiment, the homogenizing in step b) is carried out once or several times, preferably 1 to 5 times, more preferably 1 to 3 times.

According to yet another embodiment, the homogenizing in step b) is carried out by milling.

According to one embodiment, the homogenizing in step b) is carried out at a) a pressure ranging from 50 to 900 bar, preferably from 100 to 750 bar, and most preferably from 200 to 650 bar, and/or b) an initial temperature ranging from 5 to 95° C., preferably from 10 to 80° C., and most preferably from 15 to 60° C.

According to another embodiment, the spray drying in step c) is carried out at a) a pressure ranging from 0.1 to 300 bar, preferably from 5 to 100 bar, more preferably from 6 to <50 bar, and most preferably from 7 to 25 bar, and/or b) a temperature measured as inlet temperature ranging from 150 to 950° C., preferably from 175 to 700° C., and most preferably from 180 to 550° C.

According to a further aspect, granules are provided comprising a surface-reacted calcium carbonate, wherein the surface-reacted calcium carbonate is a reaction product of natural ground or precipitated calcium carbonate with car-bon dioxide and one or more acids, wherein the carbon dioxide is formed in situ by the acid treatment and/or is supplied from an external source, the granules having a bulk density ranging from 0.25 to 0.70 g/mL, preferably from 0.28 to 0.65 g/mL, more preferably from 0.30 to 0.60 g/mL and most preferably from 0.35 to 0.60 g/mL According to one embodiment, the granules have a) a volume particle size $d_{90}$ of from 50 to 500 μm, preferably from 60 to 400 μm, and most preferably from 70 to 350 μm, as measured dry at 0.1 bar dispersion pressure by laser diffraction, b) a volume median particle size $d_{50}$ of from 5 to 300 μm, preferably from 10 to 200 μm, and most preferably from 12 to 175 μm, as measured dry at 0.1 bar dispersion pressure by laser diffraction and c) a volume particle size $d_{10}$ of from 1 to 100 μm, preferably from 1 to 90 μm, and most preferably from 1 to 80 μm, as measured dry at 0.1 bar dispersion pressure by laser diffraction and/or d) a spherical shape.

According to another embodiment, the granules comprise particles of surface-reacted calcium carbonate having a) a BET specific surface area of from 1 m²/g to 200 m²/g, preferably 2 m²/g to 150 m²/g, more preferably 20 m²/g to 140 m²/g, most preferably 40 m²/g to 70 m²/g, measured using nitrogen and the BET method according to ISO 9277:2010, and/or b) a volume median grain diameter $d_{50}$ of from 0.5 to 50 μm, preferably from 0.7 to 25 μm, more preferably 0.8 to 20 μm, particularly 1 to 10 μm, measured by using laser diffraction, and/or c) an intra-particle intruded specific pore volume within the range from 0.15 to 1.60 cm³/g, preferably from 0.30 to 1.50 cm³/g, more preferably from 0.30 to 1.40 cm³/g, and most preferably from 0.30 to 1.35 cm³/g calculated from a mercury intrusion porosimetry measurement.

According to yet another embodiment, the granules com-prise at least one disintegrant, preferably the at least one disintegrant is selected from the group comprising sodium croscarmellose, modified cellulose gums, insoluble cross-linked polyvinylpyrrolidones, starches, modified starches, starch glycolates such as sodium starch glycolate, micro crystalline cellulose, pregelatinized starch, sodium car-boxymethyl starch, low-substituted hydroxypropyl cellu-lose, homopolymers of N-vinyl-2-pyrrolidone, alkyl-, hydroxyalkyl-, carboxyalkyl-cellulose esters, alginates, microcrystalline cellulose and its polymorphic forms, ion exchange resins, gums, chitin, chitosan, clays, gellan gum, crosslinked polacrilin copolymers, agar, gelatine, dextrines, acrylic acid polymers, carboxymethylcellulose sodium/cal-cium, hydroxypropyl methyl cellulose phthalate, shellac, effervescent mixtures such as bicarbonates in combination with one or more acids, e.g. citric acid or tartaric acid, or mixtures thereof.

According to one embodiment, the granules comprise the at least one disintegrant in an amount ranging from 0.25 to 35 wt.-%, preferably of from 0.5 to 15 wt.-%, more prefer-ably of from 0.5 to 10 wt.-%, even more preferably of from 0.7 to 10 wt.-%, most preferably of from 0.8 to 10 wt.-%, based on the total dry weight of the granules.

According to another embodiment, the granules are obtained by a method as defined herein.

According to another aspect, the use of granules as defined herein in a nutraceutical product, agricultural prod-uct, veterinary product, cosmetic product, preferably in a dry cosmetic and/or dry skin care composition, home product, food product, packaging product or personal care product, preferably in an oral care composition, or as excipient in a pharmaceutical product is provided.

It should be understood that for the purpose of the present invention the following terms have the following meaning.

The term "surface-reacted" in the meaning of the present application shall be used to indicate that a material has been subjected to a process comprising partial dissolution of said material upon treatment with an $H_3O^+$ ion donor (e.g., by use of water-soluble free acids and/or acidic salts) in aqueous environment followed by a crystallization process which may occur in the absence or presence of further crystalliza-tion additives.

An "$H_3O^+$ ion donor" in the context of the present invention is a Brønsted acid and/or an acid salt, i.e. a salt containing an acidic hydrogen.

The term "acid" as used herein refers to an acid in the meaning of the definition by Brønsted and Lowry (e.g., $H_2SO_4$, $HSO_4^-$).

In the meaning of the present invention "water-insoluble" materials are defined as materials which, when mixed with deionised water and filtered on a filter having a 0.2 μm pore size at 20° C. to recover the liquid filtrate, provide less than or equal to 0.1 g of recovered solid material following evaporation at 95 to 100° C. of 100 g of said liquid filtrate.

"Water-soluble" materials are defined as materials leading to the recovery of greater than 0.1 g of recovered solid material following evaporation at 95 to 100° C. of 100 g of said liquid filtrate.

"Natural ground calcium carbonate" (GCC) in the meaning of the present invention is a calcium carbonate obtained from natural sources, such as limestone, marble, or chalk, and processed through a wet and/or dry treatment such as grinding, screening and/or fractionating, for example, by a cyclone or classifier.

"Precipitated calcium carbonate" (PCC) in the meaning of the present invention is a synthesised material, obtained by precipitation following reaction of carbon dioxide and lime in an aqueous, semi-dry or humid environment or by precipitation of a calcium and carbonate ion source in water. PCC may be in the amorphous, vateritic, calcitic or aragonitic crystal form.

The BET specific surface area in the meaning of the present invention is defined as the surface area of the particles divided by the mass of the particles. As used therein the specific surface area is measured by adsorption using the BET isotherm (ISO 9277:2010) and is specified in $m^2/g$.

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" though such a limited understanding is always included by the terms "obtained" or "defined" as a preferred embodiment.

According to the present invention, the method for the production of granules comprising surface-reacted calcium carbonate must comprise the steps of a) providing an aqueous suspension comprising a surface-reacted calcium carbonate, wherein the surface-reacted calcium carbonate is a reaction product of natural ground or precipitated calcium carbonate with carbon dioxide and one or more acids, wherein the carbon dioxide is formed in situ by the acid treatment and/or is supplied from an external source;

b) homogenizing the aqueous suspension comprising a surface-reacted calcium carbonate of step a), and c) removing the liquid from the aqueous suspension comprising a surface-reacted calcium carbonate of step b) by means of spray drying for obtaining granules comprising surface-reacted calcium carbonate.

It has been especially found out that the method according to the present invention must comprise a step of homogenizing an aqueous suspension comprising a surface-reacted calcium carbonate for obtaining granules having a high bulk density, flow properties and compactability as well as high mechanical stability.

In the following, it is referred to further details of the present invention and especially the foregoing method for the production of granules comprising surface-reacted calcium carbonate.

One requirement of the present invention is that according to step a), an aqueous suspension comprising a surface-reacted calcium carbonate is provided, wherein the surface-reacted calcium carbonate is a reaction product of natural ground or precipitated calcium carbonate with carbon dioxide and one or more acids, wherein the carbon dioxide is formed in situ by the acid treatment and/or is supplied from an external source, preferably the carbon dioxide is formed in situ by the acid treatment.

The surface-reacted calcium carbonate is a reaction product of natural ground calcium carbonate or precipitated calcium carbonate with carbon dioxide and one or more $H_3O^+$ ion donors in an aqueous medium, wherein the carbon dioxide is formed in-situ by the $H_3O^+$ ion donors treatment and/or is supplied from an external source. Preferably, the surface-reacted calcium carbonate is a reaction product of natural ground calcium carbonate or precipitated calcium carbonate with carbon dioxide and one or more $H_3O^+$ ion donors in an aqueous medium, wherein the carbon dioxide is formed in-situ by the $H_3O^+$ ion donors treatment or is supplied from an external source. More preferably, the surface-reacted calcium carbonate is a reaction product of natural ground calcium carbonate or precipitated calcium carbonate with carbon dioxide and one or more $H_3O^+$ ion donors in an aqueous medium, wherein the carbon dioxide is formed in-situ by the $H_3O^+$ ion donors treatment.

A $H_3O^+$ ion donor in the context of the present invention is a Brønsted acid and/or an acid salt.

In a preferred embodiment of the invention, the surface-reacted calcium carbonate is obtained by a process comprising the steps of: (a) providing a suspension of natural or precipitated calcium carbonate, (b) adding at least one acid having a $pK_{a1}$ value of 0 or less at 20° C. or having a $pK_{a1}$ value from 0 to 2.5 at 20° C. to the suspension of step a), and (c) treating the suspension of step (a) with carbon dioxide before, during or after step (b). According to another embodiment the surface-reacted calcium carbonate is obtained by a process comprising the steps of: (A) providing a natural or precipitated calcium carbonate, (B) providing at least one water-soluble acid, (C) providing gaseous $CO_2$, (D) contacting said natural or precipitated calcium carbonate of step (A) with the at least one acid of step (B) and with the $CO_2$ of step (C), characterised in that: (i) the at least one acid of step B) has a $pK_{a1}$ of greater than 2.5 and less than or equal to 7 at 20° C., associated with the ionisation of its first available hydrogen, and a corresponding anion is formed on loss of this first available hydrogen capable of forming a water-soluble calcium salt, and (ii) following contacting the at least one acid with natural or precipitated calcium carbonate, at least one water-soluble salt, which in the case of a hydrogen-containing salt has a $pK_{a1}$ of greater than 7 at 20° C., and the salt anion of which is capable of forming water-insoluble calcium salts, is additionally provided.

"Natural ground calcium carbonate" (GCC) preferably is selected from calcium carbonate containing minerals selected from the group comprising marble, chalk, limestone and mixtures thereof. Natural calcium carbonate may comprise further naturally occurring components such as alumino silicate etc.

In general, the grinding of natural ground calcium carbonate may be a dry or wet grinding step and may be carried out with any conventional grinding device, for example, under conditions such that comminution predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case the calcium carbonate containing mineral material comprises a wet ground calcium carbonate containing mineral material, the grinding step may be performed under conditions such that autogenous grinding takes place and/or by horizontal and/or vertical ball milling, and/or other such processes known to the skilled man. The wet processed ground calcium carbonate containing mineral material thus obtained may be washed and dewatered by well-known processes, e.g. by flocculation, filtration or forced evaporation prior to drying. The subsequent step of drying (if necessary) may be carried out in a single step such as spray drying, or in at least two steps. It is also common that such a mineral material undergoes a beneficiation step (such as a flotation, bleaching or magnetic separation step) to remove impurities.

"Precipitated calcium carbonate" (PCC) in the meaning of the present invention is a synthesized material, generally obtained by precipitation following reaction of carbon dioxide and calcium hydroxide in an aqueous environment or by precipitation of calcium and carbonate ions, provided in the form of soluble salts, for example $CaCl_2$ and $Na_2CO_3$, out of solution. Further possible ways of producing PCC are the lime soda process, or the Solvay process in which PCC is a by-product of ammonia production. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like form. Vaterite belongs to the hexagonal crystal system. The obtained PCC slurry can be mechanically dewatered and dried.

According to one embodiment of the present invention, the precipitated calcium carbonate is precipitated calcium carbonate, preferably comprising amorphous, aragonitic, vateritic or calcitic mineralogical crystal forms or mixtures thereof.

Precipitated calcium carbonate may be ground prior to the treatment with carbon dioxide and at least one $H_3O^+$ ion donor by the same means as used for grinding natural calcium carbonate as described above.

According to one embodiment of the present invention, the natural or precipitated calcium carbonate is in form of particles having a weight median particle size $d_{50}$ of 0.05 to 10.0 µm, preferably 0.2 to 5.0 µm, more preferably 0.4 to 3.0 µm, most preferably 0.6 to 1.2 µm, especially 0.7 µm. According to a further embodiment of the present invention, the natural or precipitated calcium carbonate is in form of particles having a top cut particle size $d_{98}$ of 0.15 to 55 µm, preferably 1 to 40 µm, more preferably 2 to 25 µm, most preferably 3 to 15 µm, especially 4 µm.

The natural and/or precipitated calcium carbonate may be used dry or suspended in water. Preferably, a corresponding slurry has a content of natural or precipitated calcium carbonate within the range of 1 wt.-% to 90 wt.-%, more preferably 3 wt.-% to 60 wt.-%, even more preferably 5 wt.-% to 40 wt.-%, and most preferably 10 wt.-% to 25 wt.-% based on the weight of the slurry.

The one or more $H_3O^+$ ion donor used for the preparation of surface reacted calcium carbonate may be any strong acid, medium-strong acid, or weak acid, or mixtures thereof, generating $H_3O^+$ ions under the preparation conditions. According to the present invention, the at least one $H_3O^+$ ion donor can also be an acidic salt, generating $H_3O^+$ ions under the preparation conditions.

According to one embodiment, the at least one $H_3O^+$ ion donor is a strong acid having a $pK_{a1}$ of 0 or less at 20° C.

According to another embodiment, the at least one $H_3O^+$ ion donor is a medium-strong acid having a $pK_{a1}$ value from 0 to 2.5 at 20° C. If the $pK_{a1}$ at 20° C. is 0 or less, the acid is preferably selected from sulphuric acid, hydrochloric acid, or mixtures thereof. If the $pK_{a1}$ at 20° C. is from 0 to 2.5, the $H_3O^+$ ion donor is preferably selected from $H_2SO_3$, $H_3PO_4$, oxalic acid, or mixtures thereof. The at least one $H_3O^+$ ion donor can also be an acidic salt, for example, $HSO_4^-$ or $H_2PO_4^-$, being at least partially neutralized by a corresponding cation such as $Li^+$, $Na^+$ or $K^+$, or $HPO_4^{2-}$, being at least partially neutralised by a corresponding cation such as $Li^+$, $Na^+ \cdot K^+$, $Mg^{2+}$ or $Ca^{2+}$. The at least one $H_3O^+$ ion donor can also be a mixture of one or more acids and one or more acidic salts.

According to still another embodiment, the at least one $H_3O^+$ ion donor is a weak acid having a $pK_{a1}$ value of greater than 2.5 and less than or equal to 7, when measured at 20° C., and having a corresponding anion, which is capable of forming water-soluble calcium salts. Subsequently, at least one water-soluble salt, which in the case of a hydrogen-containing salt has a $pK_{a1}$ of greater than 7, when measured at 20° C., and the salt anion of which is capable of forming water-insoluble calcium salts, is additionally provided. According to the preferred embodiment, the weak acid has a $pK_{a1}$ value from greater than 2.5 to 5 at 20° C., and more preferably the weak acid is selected from the group consisting of acetic acid, formic acid, propanoic acid, and mixtures thereof. Exemplary cations of said water-soluble salt are selected from the group consisting of potassium, sodium, lithium and mixtures thereof. In a more preferred embodiment, said cation is sodium or potassium. Exemplary anions of said water-soluble salt are selected from the group consisting of phosphate, dihydrogen phosphate, monohydrogen phosphate, oxalate, silicate, mixtures thereof and hydrates thereof. In a more preferred embodiment, said anion is selected from the group consisting of phosphate, dihydrogen phosphate, monohydrogen phosphate, mixtures thereof and hydrates thereof. In a most preferred embodiment, said anion is selected from the group consisting of dihydrogen phosphate, monohydrogen phosphate, mixtures thereof and hydrates thereof. Water-soluble salt addition may be performed dropwise or in one step. In the case of drop wise addition, this addition preferably takes place within a time period of 10 minutes. It is more preferred to add said salt in one step.

According to one embodiment of the present invention, the at least one $H_3O^+$ ion donor is selected from the group consisting of hydrochloric acid, sulphuric acid, sulphurous acid, phosphoric acid, citric acid, oxalic acid, acetic acid, formic acid, and mixtures thereof. Preferably the at least one $H_3O^+$ ion donor is selected from the group consisting of hydrochloric acid, sulphuric acid, sulphurous acid, phosphoric acid, oxalic acid, $H_2PO_4^-$, being at least partially neutralised by a corresponding cation such as $Li^+$, $Na^+$ or $K^+$, $HPO_4^{2-}$, being at least partially neutralised by a corresponding cation such as $Li^+$, $Nat^+ \cdot K^+$, $Mg^{2+}$, or $Ca^{2+}$ and mixtures thereof, more preferably the at least one acid is selected from the group consisting of hydrochloric acid, sulphuric acid, sulphurous acid, phosphoric acid, oxalic acid, or mixtures thereof, and most preferably, the at least one $H_3O^+$ ion donor is phosphoric acid.

The one or more $H_3O^+$ ion donor can be added to the suspension as a concentrated solution or a more diluted solution. Preferably, the molar ratio of the $H_3O^+$ ion donor to the natural or precipitated calcium carbonate is from 0.01 to 4, more preferably from 0.02 to 2, even more preferably 0.05 to 1 and most preferably 0.1 to 0.58.

As an alternative, it is also possible to add the $H_3O^+$ ion donor to the water before the natural or precipitated calcium carbonate is suspended.

In a preferred embodiment, the surface-reacted calcium carbonate is a reaction product of natural ground calcium carbonate with carbon dioxide and one or more $H_3O^+$ ion donors in an aqueous medium, wherein the carbon dioxide is formed in-situ by the $H_3O^+$ ion donors treatment and wherein the $H_3O^+$ ion donor is phosphoric acid. In a more preferred embodiment, the surface-reacted calcium carbonate is a reaction product of calcium carbonate containing minerals selected from the group comprising marble, chalk, limestone and mixtures thereof with carbon dioxide and one or more $H_3O^+$ ion donors in an aqueous medium, wherein the carbon dioxide is formed in-situ by the $H_3O^+$ ion donors treatment and wherein the $H_3O^+$ ion donor is phosphoric acid.

In a next step, the natural or precipitated calcium carbonate is treated with carbon dioxide. If a strong acid such as sulphuric acid or hydrochloric acid is used for the $H_3O^+$ ion donor treatment of the natural or precipitated calcium carbonate, the carbon dioxide is automatically formed. Alternatively or additionally, the carbon dioxide can be supplied from an external source.

$H_3O^+$ ion donor treatment and treatment with carbon dioxide can be carried out simultaneously which is the case when a strong or medium-strong acid is used. It is also possible to carry out $H_3O^+$ ion donor treatment first, e.g. with a medium strong acid having a $pK_{a1}$ in the range of 0 to 2.5 at 20° C., wherein carbon dioxide is formed in-situ, and thus, the carbon dioxide treatment will automatically be carried out simultaneously with the $H_3O^+$ ion donor treatment, followed by the additional treatment with carbon dioxide supplied from an external source.

In a preferred embodiment, the $H_3O^+$ ion donor treatment step and/or the carbon dioxide treatment step are repeated at least once, more preferably several times. According to one embodiment, the at least one $H_3O^+$ ion donor is added over a time period of at least about 5 min, preferably at least about 10 min, typically from about 10 to about 20 min, more preferably about 30 min, even more preferably about 45 min, and sometimes about 1 h or more.

Subsequent to the $H_3O^+$ ion donor treatment and carbon dioxide treatment, the pH of the aqueous suspension, measured at 20° C., naturally reaches a value of greater than 6.0, preferably greater than 6.5, more preferably greater than 7.0, even more preferably greater than 7.5, thereby preparing the surface-reacted natural or precipitated calcium carbonate as an aqueous suspension having a pH of greater than 6.0, preferably greater than 6.5, more preferably greater than 7.0, even more preferably greater than 7.5.

Further details about the preparation of the surface-reacted natural calcium carbonate are disclosed in WO0039222 A1, WO2004083316 A1, WO2005121257 A2, WO2009074492 A1, EP2264108 A1, EP2264109 A1 and US20040020410 A1, the content of these references herewith being included in the present application.

Similarly, surface-reacted precipitated calcium carbonate is obtained. As can be taken in detail from WO2009074492 A1, surface-reacted precipitated calcium carbonate is obtained by contacting precipitated calcium carbonate with $H_3O^+$ ions and with anions being solubilized in an aqueous medium and being capable of forming water-insoluble calcium salts, in an aqueous medium to form a slurry of surface-reacted precipitated calcium carbonate, wherein said surface-reacted precipitated calcium carbonate comprises an insoluble, at least partially crystalline calcium salt of said anion formed on the surface of at least part of the precipitated calcium carbonate.

Said solubilized calcium ions correspond to an excess of solubilized calcium ions relative to the solubilized calcium ions naturally generated on dissolution of precipitated calcium carbonate by $H_3O^+$ ions, where said $H_3O^+$ ions are provided solely in the form of a counterion to the anion, i.e. via the addition of the anion in the form of an acid or non-calcium acid salt, and in absence of any further calcium ion or calcium ion generating source.

Said excess solubilized calcium ions are preferably provided by the addition of a soluble neutral or acid calcium salt, or by the addition of an acid or a neutral or acid non-calcium salt which generates a soluble neutral or acid calcium salt in-situ.

Said $H_3O^+$ ions may be provided by the addition of an acid or an acid salt of said anion, or the addition of an acid or an acid salt which simultaneously serves to provide all or part of said excess solubilized calcium ions.

In a further preferred embodiment of the preparation of the surface-reacted natural or precipitated calcium carbonate, the natural or precipitated calcium carbonate is reacted with the acid and/or the carbon dioxide in the presence of at least one compound selected from the group consisting of silicate, silica, aluminium hydroxide, earth alkali aluminate such as sodium or potassium aluminate, or mixtures thereof. Preferably, the at least one silicate is selected from an aluminium silicate, a calcium silicate, or an earth alkali metal silicate. These components can be added to an aqueous suspension comprising the natural or precipitated calcium carbonate before adding the acid and/or carbon dioxide.

Alternatively, the silicate and/or silica and/or aluminium hydroxide and/or earth alkali aluminate component(s) can be added to the aqueous suspension of natural or precipitated calcium carbonate while the reaction of natural or precipitated calcium carbonate with an acid and carbon dioxide has already started. Further details about the preparation of the surface-reacted natural or precipitated calcium carbonate in the presence of at least one silicate and/or silica and/or aluminium hydroxide and/or earth alkali aluminate component(s) are disclosed in WO2004083316 A1, the content of this reference herewith being included in the present application.

The surface-reacted calcium carbonate can be kept in suspension, optionally further stabilised by a dispersant. Conventional dispersants known to the skilled person can be used. A preferred dispersant is comprised of polyacrylic acids and/or carboxymethylcelluloses.

Alternatively, the aqueous suspension described above can be dried, thereby obtaining the solid (i.e. dry or containing as little water that it is not in a fluid form) surface-reacted natural or precipitated calcium carbonate in the form of granules or a powder.

In a preferred embodiment, the surface-reacted calcium carbonate has a BET specific surface area of from 1 $m^2/g$ to 200 $m^2/g$, preferably 2 $m^2/g$ to 150 $m^2/g$, more preferably 20 $m^2/g$ to 140 $m^2/g$, most preferably 40 $m^2/g$ to 70 $m^2/g$, measured using nitrogen and the BET method according to ISO 9277:2010.

It is furthermore preferred that the surface-reacted calcium carbonate particles have a volume median particle diameter $d_{50}$ (or $d_{50}$ (vol)) of from 0.5 to 50 µm, preferably from 0.7 to 25 µm, more preferably 0.8 to 20 µm, particularly 1 to 10 µm measured by using laser diffraction.

According to an exemplary embodiment, the surface-reacted calcium carbonate has a) a volume median grain diameter $d_{50}$ of 0.5 to 50 µm, preferably from 0.7 to 25 µm, more preferably 0.8 to 20 µm, particularly 1 to 10 µm, measured by using laser diffraction, and/or b) a BET specific surface area of from 1 $m^2/g$ to 200 $m^2/g$, preferably 2 $m^2/g$ to 150 $m^2/g$, more preferably 20 $m^2/g$ to 140 $m^2/g$, most preferably 40 $m^2/g$ to 70 $m^2/g$, measured using nitrogen and the BET method according to ISO 9277:2010.

Preferably, the surface-reacted calcium carbonate has a) a volume median grain diameter $d_{50}$ of 0.5 to 50 µm, preferably from 0.7 to 25 µm, more preferably 0.8 to 20 µm, particularly 1 to 10 µm, measured by using laser diffraction, or b) a BET specific surface area of from 1 $m^2/g$ to 200 $m^2/g$, preferably 2 $m^2/g$ to 150 $m^2/g$, more preferably 20 $m^2/g$ to 140 $m^2/g$, most preferably 40 $m^2/g$ to 70 $m^2/g$, measured using nitrogen and the BET method according to ISO 9277:2010.

Alternatively, the surface-reacted calcium carbonate has a) a volume median grain diameter $d_{50}$ of 0.5 to 50 µm, preferably from 0.7 to 25 µm, more preferably 0.8 to 20 µm, particularly 1 to 10 µm, measured by using laser diffraction, and b) a BET specific surface area of from 1 $m^2/g$ to 200 $m^2/g$, preferably 2 $m^2/g$ to 150 $m^2/g$, more preferably 20 $m^2/g$ to 140 $m^2/g$, most preferably 40 $m^2/g$ to 70 $m^2/g$, measured using nitrogen and the BET method according to ISO 9277:2010.

It may furthermore be preferred that the surface-reacted calcium carbonate particles have a volume particle diameter $d_{98}$ (or $d_{98}$ (vol)) of from 2 to 150 µm, preferably from 4 to 100 µm, more preferably 6 to 80 µm, even more preferably from 8 to 60 µm, and most preferably from 10 to 30 µm.

The value $d_x$ represents the diameter relative to which x % of the particles have diameters less than $d_x$. This means that the $d_{98}$ value is the particle size at which 98% of all particles are smaller. The $d_{98}$ value is also designated as "top cut". The $d_x$ values may be given in volume or weight percent. The $d_{50}$(wt) value is thus the weight median particle size, i.e. 50 wt.-% of all grains are smaller than this size, and the $d_{50}$ (vol) value is the volume median particle size, i.e. 50 vol. % of all grains are smaller than this particle size.

The "particle size" of surface-reacted calcium carbonate herein is described as volume-based particle size distribution. The "particle size" of the granules herein is described as volume-based particle size distribution. Furthermore, the "particle size" of surface-reacted calcium carbonate in the meaning of the present invention refers to the primary particle size.

Volume median particle diameter $d_{50}$ was evaluated using a Malvern Mastersizer 2000 or 3000 Laser Diffraction System. The $d_{10}$, $d_{50}$ or $d_{98}$ value, measured using a Malvern Mastersizer 2000 or 3000 Laser Diffraction System, indicates a diameter value such that 10%, 50% or 98% by volume, respectively, of the particles have a diameter of less than this value. The raw data obtained by the measurement are analysed using the Mie theory, with a particle refractive index of 1.57 and an absorption index of 0.005.

Throughout the present invention, the volume-based particle size distribution is determined by laser diffraction. For example, the volume-based particle size distribution of the granules is measured dry at 0.1 bar dispersion pressure by laser diffraction as described in detail in the examples herein below.

Preferably, the surface-reacted calcium carbonate has an intra-particle intruded specific pore volume within the range from 0.15 to 1.60 $cm^3/g$, preferably from 0.30 to 1.50 $cm^3/g$, more preferably from 0.30 to 1.40 $cm^3/g$, and most preferably from 0.30 to 1.35 $cm^3/g$ calculated from a mercury intrusion porosimetry measurement.

The specific pore volume is measured using a mercury intrusion porosimetry measurement using a Micromeritics Autopore V 9620 mercury porosimeter having a maximum applied pressure of mercury 414 MPa (60 000 psi), equivalent to a Laplace throat diameter of 0.004 µm (~nm). The equilibration time used at each pressure step is 20 seconds. The sample material is sealed in a 5 $cm^3$ chamber powder penetrometer for analysis. The data are corrected for mercury compression, penetrometer expansion and sample material compression using the software Pore-Comp (Gane, P. A. C., Kettle, J. P., Matthews, G. P. and Ridgway, C. J., "Void Space Structure of Compressible Polymer Spheres and Consolidated Calcium Carbonate Paper-Coating Formulations", Industrial and Engineering Chemistry Research, 35(5), 1996, p1753-1764).

The total pore volume seen in the cumulative intrusion data can be separated into two regions with the intrusion data from 214 µm down to about 1-4 µm showing the coarse packing of the sample between any agglomerate structures contributing strongly. Below these diameters lies the fine interparticle packing of the particles themselves. If they also have intraparticle pores, then this region appears bi modal, and by taking the specific pore volume intruded by mercury into pores finer than the modal turning point, i.e. finer than the bi-modal point of inflection, we thus define the specific intraparticle pore volume. The sum of these three regions gives the total overall pore volume of the powder, but depends strongly on the original sample compaction/settling of the powder at the coarse pore end of the distribution.

By taking the first derivative of the cumulative intrusion curve the pore size distributions based on equivalent Laplace diameter, inevitably including pore-shielding, are revealed. The differential curves clearly show the coarse agglomerate pore structure region, the interparticle pore region and the intraparticle pore region, if present. Knowing the intraparticle pore diameter range it is possible to subtract the remainder interparticle and interagglomerate pore volume from the total pore volume to deliver the desired pore volume of the internal pores alone in terms of the pore volume per unit mass (specific pore volume). The same principle of subtraction, of course, applies for isolating any of the other pore size regions of interest.

The intra-particle pore size of the surface-reacted calcium carbonate preferably is in a range of from 0.004 to 1.6 µm, more preferably in a range of between 0.005 to 1.3 µm, especially preferably from 0.006 to 1.15 µm and most preferably of 0.007 to 1.0 µm, determined by mercury porosimetry measurement.

Surface-reacted calcium carbonate comprises a water-insoluble, at least partially crystalline calcium salt of an anion of the at least one acid, which is formed on the surface of the natural ground calcium carbonate or precipitated calcium carbonate. According to one embodiment, the water-insoluble, at least partially crystalline salt of an anion of the at least one acid covers the surface of the natural ground calcium carbonate or precipitated calcium carbonate at least partially, preferably completely. Depending on the employed at least one acid, the anion may be sulphate, sulphite, phosphate, citrate, oxalate, acetate, formiate and/or chloride.

As stated above, the surface-reacted calcium carbonate is provided in form of an aqueous suspension.

Preferably, the aqueous suspension of step a) has a solids content in the range from 1 to 40 wt.-%, preferably from 5 to 35 wt.-%, and most preferably from 7 to 26 wt.-%, based on the total weight of the aqueous suspension.

For the purpose of the present invention, a "suspension" or "slurry" refers to a system comprising a liquid, i.e. an aqueous solvent, and particles of surface-reacted calcium carbonate, wherein the particles of the surface-reacted calcium carbonate are present as solids in the liquid. The aqueous suspension is more viscous and can be of higher density than the liquid from which it is formed.

The "liquid" is typically an "aqueous solvent" which does not exclude that the aqueous solvent comprises minor amounts of at least one water-miscible solvent. For example, the at least one water-miscible solvent is preferably selected from methanol, ethanol, acetone, acetonitrile, tetrahydrofuran and mixtures thereof. In one embodiment of the present invention, the liquid comprises water in an amount of at least 80 wt.-%, preferably at least 90 wt.-%, more preferably at least 95 wt.-%, even more preferably at least 99 wt.-%, based on the total weight of the aqueous solvent. Preferably, the aqueous solvent consists of water, i.e. the amount of water is 100 wt.-%, based on the total weight of the liquid.

It is further preferred that the aqueous suspension provided in step a) has a Brookfield viscosity at 100 rpm from 25 to 1 000 mPas at a temperature of +23° C. (±2° C.), preferably from 25 to 700 mPas at +23° C. (±2° C.), more preferably from 25 to 500 mPas at +23° C. (±2° C.) and most preferably from 50 to 300 mPas at +23° C. (±2° C.).

According to step b) of the present method, the aqueous suspension comprising a surface-reacted calcium carbonate of step a) is homogenized.

"Homogenizing" in the meaning of the present invention refers to a step of making the particles of the surface-reacted calcium carbonate in the aqueous suspension of step a) leads to stronger aggregates after drying in terms of granule stability.

The homogenizing can be carried out by using various methods which are well known in the art.

The homogenizing equipment may be selected from the conventionally used ones for homogenizing purposes. Thus, the homogenizing device may be selected from the group comprising a piston pump, a high-shear apparatus and the like. For example, a GEA Ariete NS3055 of GEA Mechanical Equipment Italia S.p.A. can be used for homogenizing in step b).

Alternatively, the homogenizing in step b) is carried out by milling. The homogenizing in step b) can be carried out in milling or kneading devices well known in the art. Thus, the milling or kneading device may be selected from the horizontal and vertical mills conventionally used for milling purposes or kneaders conventionally used for kneading purposes. For example, the milling device may be selected from a horizontal and/or a vertical stirred media mill, preferably a vertical stirred media mill, a horizontal and/or a vertical agitated bead mill such as a Dyno-KDL bead mill, a Netzsch LabStar or LMZ-type mill or a LME-type mill; a sand mill and the like. For example, the kneading device may be selected from a Sigma-Kneader, planetary mixer and the like.

It might be noted that there may be differences as regards the particle size distributions to be achieved depending on the method used.

The homogenizing in step b) is carried out once or several times. It is appreciated that the number of times for carrying out step b) depends mainly on the pressure used and the surface-reacted calcium carbonate particles obtained in step b). The skilled person can thus easily adapt the number of times for carrying out step b) in accordance with the equipment or conditions used during step b). Thus, the homogenizing in step b) can be carried out in recirculation mode.

It is preferred that the homogenizing in step b) is carried out 1 to 5 times, more preferably 1 to 3 times, i.e. once, twice or three times, even more preferably once or twice. Most preferably, the homogenizing in step b) is carried out twice.

It is appreciated that the homogenizing in step b) is preferably carried out by using a high-pressure homogenizer.

In one embodiment, the homogenizing in step b) is carried out at a pressure ranging from 50 to 900 bar, preferably from 100 to 750 bar, and most preferably from 200 to 650 bar.

Additionally or alternatively, the homogenizing in step b) is carried out at an initial temperature ranging from 5 to 95° C., preferably from 10 to 80° C., and most preferably from 15 to 60° C.

Thus, it is preferred that the homogenizing in step b) is carried out at a) a pressure ranging from 50 to 900 bar, preferably from 100 to 750 bar, and most preferably from 200 to 650 bar, or b) an initial temperature ranging from 5 to 95° C., preferably from 10 to 80° C., and most preferably from 15 to 60° C.

More preferably, the homogenizing in step b) is carried out at a) a pressure ranging from 50 to 900 bar, preferably from 100 to 750 bar, and most preferably from 200 to 650 bar, and b) an initial temperature ranging from 5 to 95° C., preferably from 10 to 80° C., and most preferably from 15 to 60° C.

Preferably, the aqueous suspension has a solids content in the range from 1 to 40 wt.-%, preferably from 5 to 35 wt.-%, and most preferably from 7 to 26 wt.-%, based on the total weight of the aqueous suspension, in step b).

It is appreciated that the homogenizing in step b) may result in an increase of the solids content in the aqueous suspension compared to the aqueous suspension subjected to step b). For example, the aqueous suspension obtained in homogenizing step b) may have a solids content being at least 1%, more preferably at least 2% and most preferably at least 3%, e.g. from 3 to 4% above the solids content of the aqueous suspension subjected to step b). This is especially applicable if step b) is carried out in a homogenizer.

If step b) is carried out by milling, the aqueous suspension obtained in homogenizing step b) preferably has a solids content being at most 3%, more preferably at most 2% and most preferably at most 1%, above the solids content of the aqueous suspension subjected to step b).

It is appreciated that the homogenizing by milling is preferably carried out at a specific energy ranging from 25 to 125 kWh/ton of dry product, preferably from 35 to 100 kWh/ton of dry product.

Additionally or alternatively, the homogenizing by milling is carried out an initial temperature ranging from 5 to 95° C., preferably from 10 to 80° C., and most preferably from 15 to 60° C.

Thus, it is preferred that the homogenizing by milling in step b) is carried out at c) a specific energy ranging from 25 to 125 kWh/ton of dry product, preferably from 35 to 100 kWh/ton of dry product, or d) an initial temperature ranging from 5 to 95° C., preferably from 10 to 80° C., and most preferably from 15 to 60° C.

More preferably, the homogenizing by milling in step b) is carried out at c) a specific energy ranging from 25 to 125 kWh/ton of dry product, preferably from 35 to 100 kWh/ton of dry product, and d) an initial temperature ranging from 5 to 95° C., preferably from 10 to 80° C., and most preferably from 15 to 60° C.

In one embodiment, at least one disintegrant is added before and/or during and/or after step b). Preferably, the at least one disintegrant is added before or during or after step b), more preferably before or after step b). Most preferably, the at least one disintegrant is added after step b).

In one embodiment of the present invention, the at least one disintegrant comprises, preferably consists of, one disintegrant. Alternatively, the at least one disintegrant comprises, preferably consists of, two or more disintegrants. For example, the at least one disintegrant comprises, preferably consists of, two or three disintegrants.

Preferably, the at least one disintegrant comprises, preferably consists of, one disintegrant.

It is to be noted that the disintegrant(s) which may be used in the method of the present invention generally are those well-known in the art of granulation.

It is to be noted that any compound known as disintegrant or which may act as a disintegrant may be used in the method of the present invention.

In a preferred embodiment, the at least one disintegrant may be selected from the group comprising sodium croscarmellose, modified cellulose gums, insoluble cross-linked polyvinylpyrrolidones, starches, modified starches, starch glycolates such as sodium starch glycolate, micro crystalline cellulose, pregelatinized starch, sodium carboxymethyl starch, low-substituted hydroxypropyl cellulose, homopolymers of N-vinyl-2-pyrrolidone, alkyl-, hydroxyalkyl-, carboxyalkyl-cellulose esters, alginic acid, microcrystalline cellulose and its polymorphic forms, ion exchange resins, gums, chitin, chitosan, clays, gellan gum, crosslinked polacrilin copolymers, agar, gelatine, dextrines, acrylic acid polymers, carboxymethylcellulose sodium/calcium, hydroxypropyl methyl cellulose phthalate, shellac, effervescent mixtures such as bicarbonates in combination with one or more acids, e.g. citric acid or tartaric acid, or mixtures thereof. Preferably, the at least one disintegrant is sodium croscarmellose. The at least one disintegrant can be also a superdisintegrant. The superdisintegrant(s) that may be used in the method of the present invention generally are those well-known in the art. Exemplary superdisintegrants include but are not limited to sodium croscarmellose, insoluble cross-linked polyvinylpyrrolidones, sodium starch glycolate, and mixtures thereto.

If at least one disintegrant is added before and/or during and/or after step b), the at least one disintegrant is preferably added in an amount ranging from 0.3 to 10 wt.-%, preferably from 0.5 to 8 wt.-%, more preferably from 0.8 to about 5 wt.-%, and most preferably from 1 to about 5 wt.-%, based on the total dry weight of the surface-reacted calcium carbonate.

The at least one disintegrant may be added in dry form, or in the form of emulsions, dispersions, or solutions.

Thus, in one embodiment, the method for the production of granules comprising surface-reacted calcium carbonate comprises the steps of a) providing an aqueous suspension comprising a surface-reacted calcium carbonate, wherein the surface-reacted calcium carbonate is a reaction product of natural ground or precipitated calcium carbonate with carbon dioxide and one or more acids, wherein the carbon dioxide is formed in situ by the acid treatment and/or is supplied from an external source, preferably the carbon dioxide is formed in situ by the acid treatment;

b) homogenizing the aqueous suspension comprising a surface-reacted calcium carbonate of step a), c) removing the liquid from the aqueous suspension comprising a surface-reacted calcium carbonate of step b) by means of spray drying for obtaining granules comprising surface-reacted calcium carbonate, and d) adding at least one disintegrant before and/or during and/or after step b) into the aqueous suspension.

Alternatively, the method may comprise a step d) of mechanically and/or physically disintegrating the aqueous suspension comprising a surface-reacted calcium carbonate before and/or during and/or after step b).

Such mechanical and/or physical disintegration may be carried out by any method known to the skilled person as being suitable for such purpose. For example, the mechanical and/or physical disintegration step d) may be carried out by ultrasonic probes and the like.

Thus, in one embodiment, the method for the production of granules comprising surface-reacted calcium carbonate comprises the steps of a) providing an aqueous suspension comprising a surface-reacted calcium carbonate, wherein the surface-reacted calcium carbonate is a reaction product of natural ground or precipitated calcium carbonate with carbon dioxide and one or more acids, wherein the carbon dioxide is formed in situ by the acid treatment and/or is supplied from an external source, preferably the carbon dioxide is formed in situ by the acid treatment;

b) homogenizing the aqueous suspension comprising a surface-reacted calcium carbonate of step a), c) removing the liquid from the aqueous suspension comprising a surface-reacted calcium carbonate of step b) by means of spray drying for obtaining granules comprising surface-reacted calcium carbonate, and d) mechanically and/or physically disintegrating the aqueous suspension comprising a surface-reacted calcium carbonate before and/or during and/or after step b).

It is appreciated that further additives suitable for improving the mouthfeeling, palatability or controlled release such as mannitol, carboxymethylcellulose or ground calcium carbonate (GCC) may be added before and/or during and/or after step b), preferably before or after step b), most preferably after step b).

Such additives, if added, are preferably added in an amount ranging from 0.3 to 40 wt.-%, preferably from 0.5 to 30 wt.-%, more preferably from 1 to about 25 wt.-% based on the total dry weight of the surface-reacted calcium carbonate.

According to step c) of the present invention the liquid is removed from the aqueous suspension comprising a surface-reacted calcium carbonate of step b) by means of spray drying for obtaining granules comprising surface-reacted calcium carbonate.

The spray drying equipment may be selected from the conventionally used ones for spray drying purposes. Thus, the spray dryer may be selected from the group comprising rotary atomizer, fountain nozzle, bi-fluid nozzle, pressure nozzle, combi-nozzle, and the like. Preferably, spray-drying step c) is carried out by using a rotary atomizer or a bi-fluid nozzle. If homogenizing step b) is carried out by milling, the spray dryer may be selected from the conventionally used ones for spray drying, e.g. the spray dryer may be selected from the group comprising rotary atomizer, fountain nozzle, bi-fluid nozzle, pressure nozzle, combi-nozzle, and the like. As regards the fountain nozzle, it is to be noted that it may be also referred to as a pressure nozzle which is run in a fountain (or co-current) mode. In one embodiment, homogenizing step b) is carried out by milling and spray-drying step c) is carried out by using a rotary atomizer. It is appreciated that different conditions are to be set for the different spray drying techniques in order to achieve the desired granules. However, the skilled person knows how to adapt such conditions for the different spray drying techniques.

For example, if a pressure nozzle is used, the spray drying in step c) is carried out at a) a feed pressure ranging from 0.1 to 300 bar, preferably from 5 to 100 bar, more preferably from 6 to <50 bar, and most preferably from 7 to 25 bar, and/or b) a temperature measured as inlet temperature ranging from 150 to 950° C., preferably from 175 to 700° C., and most preferably from 180 to 550° C.

In one embodiment, if a pressure nozzle is used, the spray drying in step c) is carried out at a) feed a pressure ranging from 0.1 to 300 bar, preferably from 5 to 100 bar, more preferably from 6 to <50 bar, and most preferably from 7 to 25 bar, or b) a temperature measured as inlet temperature ranging from 150 to 950° C., preferably from 175 to 700° C., and most preferably from 180 to 550° C.

Preferably, if a pressure nozzle is used, the spray drying in step c) is carried out at a) a feed pressure ranging from 0.1 to 300 bar, preferably from 5 to 100 bar, more preferably from 6 to <50 bar, and most preferably from 7 to 25 bar, and b) a temperature measured as inlet temperature ranging from 150 to 950° C., preferably from 175 to 700° C., and most preferably from 180 to 550° C.

In one embodiment, if a bi-fluid nozzle is used, the spray drying in step c) is carried out at a) a feed pressure ranging from 0.1 to 300 bar, preferably from 5 to 100 bar, more preferably from 6 to <50 bar, and most preferably from 7 to 25 bar, and/or b) an orifice diameter ranging from 0.8 to 1.8 mm, preferably from 0.9 to 1.6 mm, and most preferably from 1.05 to 1.5 mm, and/or c) a temperature measured as inlet temperature ranging from 150 to 950° C., preferably from 175 to 700° C., and most preferably from 180 to 550° C., and/or d) an air pressure to the nozzle from 1 to 7 bar, preferably from 1.5 to 6.5 bar and most preferably from 2 to 6 bar.

For example, if a bi-fluid nozzle is used, the spray drying in step c) is carried out at a) a feed pressure ranging from 0.1 to 300 bar, preferably from 5 to 100 bar, more preferably from 6 to <50 bar, and most preferably from 7 to 25 bar, or b) an orifice diameter ranging from 0.8 to 1.8 mm, preferably from 0.9 to 1.6 mm, and most preferably from 1.05 to 1.5 mm, or c) a temperature measured as inlet temperature ranging from 150 to 950° C., preferably from 175 to 700° C., and most preferably from 180 to 550° C., or d) an air pressure to the nozzle from 1 to 7 bar, preferably from 1.5 to 6.5 bar and most preferably from 2 to 6 bar.

Alternatively, if a bi-fluid nozzle is used, the spray drying in step c) is carried out at a) a feed pressure ranging from 0.1 to 300 bar, preferably from 5 to 100 bar, more preferably from 6 to <50 bar, and most preferably from 7 to 25 bar, and b) an orifice diameter ranging from 0.8 to 1.8 mm, preferably from 0.9 to 1.6 mm, and most preferably from 1.05 to 1.5 mm, and c) a temperature measured as inlet temperature ranging from 150 to 950° C., preferably from 175 to 700° C., and most preferably from 180 to 550° C., and d) an air pressure to the nozzle from 1 to 7 bar, preferably from 1.5 to 6.5 bar and most preferably from 2 to 6 bar.

It is appreciated that bi-fluid nozzles are well known in the art and include for example combi nozzles of GEA-Niro, Denmark.

In one embodiment, if a rotary atomizer is used, the spray drying in step c) is carried out at a) a feed pressure ranging from 0.5 to 8 bar, preferably from 1 to 6.5 bar, and most preferably from 2 to 4.5 bar, and/or b) a speed of the rotary wheel of ≤11 000, preferably from 8 000 to 11 000 rpm, more preferably from 9 000 to 10 000 rpm (at a wheel diameter of d=150 mm and/or a velocity of 73 m/sec), and/or c) a temperature measured as inlet temperature ranging from 150 to 950° C., preferably from 175 to 700° C., and most preferably from 180 to 550° C.

For example, if a rotary atomizer is used, the spray drying in step c) is carried out at a) a feed pressure ranging from 0.5 to 8 bar, preferably from 1 to 6.5 bar, and most preferably from 2 to 4.5 bar, or b) a speed of the rotary wheel of ≤11 000, preferably from 8 000 to 11 000 rpm, more preferably from 9 000 to 10 000 rpm (at a wheel diameter of d=150 mm and/or a velocity of 73 m/sec), or c) a temperature measured as inlet temperature ranging from 150 to 950° C., preferably from 175 to 700° C., and most preferably from 180 to 550° C.

Alternatively, if a rotary atomizer is used, the spray drying in step c) is carried out at a) a pressure ranging from 0.5 to 8 bar, preferably from 1 to 6.55 bar, and most preferably from 2 to 4.5 bar, and b) a speed of the rotary wheel of ≤11 000, preferably from 8 000 to 11 000 rpm, more preferably from 9 000 to 10 000 rpm (at a wheel diameter of d=150 mm and/or a velocity of 73 m/sec), and c) a temperature measured as inlet temperature ranging from 150 to 950° C., preferably from 175 to 700° C., and most preferably from 180 to 550° C.

In one embodiment, if a fountain nozzle is used, the spray drying in step c) is carried out at a) a feed pressure ranging from 8 to 60 bar, preferably from 10 to 25 bar, and most preferably from 11 to 18 bar, and/or b) a temperature measured as inlet temperature ranging from 150 to 950° C., preferably from 175 to 700° C., and most preferably from 180 to 550° C.

For example, if a fountain nozzle is used, the spray drying in step c) is carried out at a) a feed pressure ranging from 8 to 60 bar, preferably from 10 to 25 bar, and most preferably from 11 to 18 bar, or b) a temperature measured as inlet temperature ranging from 150 to 950° C., preferably from 175 to 700° C., and most preferably from 180 to 550° C.

Alternatively, if a fountain nozzle is used, the spray drying in step c) is carried out at a) a pressure ranging from 8 to 60 bar, preferably from 10 to 25 bar, and most preferably from 11 to 18 bar, and b) a temperature measured as inlet temperature ranging from 150 to 950° C., preferably from 175 to 700° C., and most preferably from 180 to 550° C.

The granules obtained in step c) are preferably in a dry form, i.e. a free flowing form.

The term "dry" granules is understood to be a material having less than 4% by weight of water relative to the granule weight. The % water may be determined by heating the granules to 105° C. in a drying chamber using the method according to ISO 787-2.

The granules obtained by the present process have a favourable bulk density. Thus, the present invention refers in another aspect to granules comprising a surface-reacted calcium carbonate, wherein the surface-reacted calcium carbonate is a reaction product of natural ground or precipitated calcium carbonate with carbon dioxide and one or more acids, wherein the carbon dioxide is formed in situ by the acid treatment and/or is supplied from an external source, the granules having a bulk density ranging from 0.25 to 0.70 g/mL. Preferably, the granules comprise a surface-reacted calcium carbonate, wherein the surface-reacted calcium carbonate is a reaction product of natural ground or precipitated calcium carbonate with carbon dioxide and one or more acids, wherein the carbon dioxide is formed in situ by the acid treatment, the granules having a bulk density ranging from 0.25 to 0.70 g/mL.

For example, the granules have a bulk density ranging from 0.28 to 0.65 g/mL, more preferably from 0.30 to 0.60 g/mL and most preferably from 0.35 to 0.60 g/mL.

It is appreciated that the granules preferably have a very specific particle size distribution that can be adjusted according to the process used.

In particular, the granules have a) a volume particle size $d_{90}$ of from 50 to 500 µm, as measured dry at 0.1 bar dispersion pressure by laser diffraction n, b) a volume median particle size $d_{50}$ of from 5 to 300 µm, as measured dry at 0.1 bar dispersion pressure by laser diffraction, and c) a volume particle size $d_{10}$ of 1 to 100 µm, as measured dry at 0.1 bar dispersion pressure by laser diffraction.

Preferably, the granules have a) a volume particle size $d_{90}$ of from 60 to 400 µm, as measured dry at 0.1 bar dispersion pressure by laser diffraction, b) a volume median particle size $d_{50}$ of from 10 to 200 µm, as measured dry at 0.1 bar dispersion pressure by laser diffraction, and c) a volume particle size $d_{10}$ of from 1 to 90 µm, as measured dry at 0.1 bar dispersion pressure by laser diffraction.

Most preferably, the granules have a) a volume particle size $d_{90}$ of from 70 to 350 µm, as measured dry at 0.1 bar dispersion pressure by laser diffraction, b) a volume median particle size $d_{50}$ of from 12 to 175 µm, as measured dry at 0.1 bar dispersion pressure by laser diffraction, and c) a volume particle size $d_{10}$ of from 1 to 80 µm, as measured dry at 0.1 bar dispersion pressure by laser diffraction.

In one embodiment, especially if step b) is carried out in a homogenizer, the granules have d) a volume particle size $d_{90}$ of from 50 to 500 µm, as measured dry at 0.1 bar dispersion pressure by laser diffraction, e) a volume median particle size $d_{50}$ of from 20 to 300 µm, as measured dry at 0.1 bar dispersion pressure by laser diffraction, and f) a volume particle size $d_{10}$ of 2 to 100 µm, as measured dry at 0.1 bar dispersion pressure by laser diffraction.

Preferably, the granules have d) a volume particle size $d_{90}$ of from 60 to 400 µm, as measured dry at 0.1 bar dispersion pressure by laser diffraction, e) a volume median particle size $d_{50}$ of from 30 to 200 µm, as measured dry at 0.1 bar dispersion pressure by laser diffraction, and f) a volume particle size $d_{10}$ of from 3 to 90 µm, as measured dry at 0.1 bar dispersion pressure by laser diffraction.

Most preferably, the granules have d) a volume particle size $d_{90}$ of from 70 to 350 µm, as measured dry at 0.1 bar dispersion pressure by laser diffraction, e) a volume median particle size $d_{50}$ of from 50 to 175 µm, as measured dry at 0.1 bar dispersion pressure by laser diffraction, and f) a volume particle size $d_{10}$ of from 10 to 80 µm, as measured dry at 0.1 bar dispersion pressure by laser diffraction.

Additionally or alternatively, the granules have a spherical shape. A "spherical shape" in the meaning of the present invention refers to a granule that has almost the same diameter on all axis in a three-dimensional space.

Thus, the granules preferably have a) a volume particle size $d_{90}$ of from 50 to 500 µm, preferably from 60 to 400 µm, and most preferably from 70 to 350 µm, as measured dry at 0.1 bar dispersion pressure by laser diffraction, a) a volume median particle size $d_{50}$ of from 5 to 300 µm, preferably from 10 to 200 µm, and most preferably from 12 to 175 µm, as measured dry at 0.1 bar dispersion pressure by laser diffraction, and b) a volume particle size $d_{10}$ of from 1 to 100 µm, preferably from 1 to 90 µm, and most preferably from 1 to 80 µm, as measured dry at 0.1 bar dispersion pressure by laser diffraction, or c) a spherical shape.

Alternatively, the granules have a) a volume particle size $d_{90}$ of from 50 to 500 µm, preferably from 60 to 400 µm, and most preferably from 70 to 350 µm, as measured dry at 0.1 bar dispersion pressure by laser diffraction, b) a volume median particle size $d_{50}$ of from 5 to 300 µm, preferably from 10 to 200 µm, and most preferably from 12 to 175 µm, as measured dry at 0.1 bar dispersion pressure by laser diffraction, and c) a volume particle size $d_{10}$ of from 1 to 100 µm, preferably from 1 to 90 µm, and most preferably from 1 to 80 µm, as measured dry at 0.1 bar dispersion pressure by laser diffraction, and d) a spherical shape.

For example, especially if step b) is carried out in a homogenizer, the granules have b) a volume particle size $d_{90}$ of from 50 to 500 µm, preferably from 60 to 400 µm, and most preferably from 70 to 350 µm, as measured dry at 0.1 bar dispersion pressure by laser diffraction, d) a volume median particle size $d_{50}$ of from 20 to 300 µm, preferably from 30 to 200 µm, and most preferably from 50 to 175 µm, as measured dry at 0.1 bar dispersion pressure by laser diffraction, and e) a volume particle size $d_{10}$ of from 2 to 100 µm, preferably from 3 to 90 µm, and most preferably from 10 to 80 µm, as measured dry at 0.1 bar dispersion pressure by laser diffraction, or f) a spherical shape.

Alternatively, the granules have e) a volume particle size $d_{90}$ of from 50 to 500 µm, preferably from 60 to 400 µm, and most preferably from 70 to 350 µm, as measured dry at 0.1 bar dispersion pressure by laser diffraction, f) a volume median particle size $d_{50}$ of from 20 to 300 µm, preferably from 30 to 200 µm, and most preferably from 50 to 175 µm, as measured dry at 0.1 bar dispersion pressure by laser diffraction, and g) a volume particle size $d_{10}$ of from 2 to 100 µm, preferably from 3 to 90 µm, and most preferably from 10 to 80 µm, as measured dry at 0.1 bar dispersion pressure by laser diffraction, and h) a spherical shape.

It is further to be noted that the granules show a favorable stability. In particular, the granules show a stability that is higher compared to granules obtained by the same method but missing the step of homogenizing the aqueous suspension comprising the surface-reacted calcium carbonate. For example, the granules have a stability determined by the ratio $d_{50}$ for (0.5 bar) vs. (0.1 bar) of ≥40, more preferably ≥50, even more preferably ≥60 and most preferably ≥70, like in the range from 70 to 120 or 70 to 110. Additionally or alternatively, the granules have a stability determined by the ratio $d_{50}$ for (1.5 bar) vs. (0.1 bar) of ≥10, more preferably ≥20, even more preferably ≥30 and most preferably ≥35, like in the range from 35 to 90 or 35 to 80.

In one embodiment, the granules have a stability determined by the ratio $d_{50}$ for (0.5 bar) vs. (0.1 bar) of ≥40, more preferably ≥50, even more preferably ≥60 and most preferably ≥70, like in the range from 70 to 120 or 70 to 110, and a stability determined by the ratio $d_{50}$ for (1.5 bar) vs. (0.1 bar) of ≥10, more preferably ≥20, even more preferably ≥30 and most preferably ≥35, like in the range from 35 to 90 or 35 to 80.

Furthermore, the granules preferably have a specific surface area of ≥15.0 $m^2/g$ as measured by the BET nitrogen method. For example, the granules have a specific surface area of 15.0 to 200.0 $m^2/g$, measured using nitrogen and the BET method according to ISO 9277:2010.

Additionally, the granules have an intra-granular specific pore volume within the range from 0.15 to 2.75 $cm^3/g$, preferably from 0.30 to 2.50 $cm^3/g$, and most preferably from 0.40 to 2.00 $cm^3/g$, calculated from a mercury intrusion porosimetry measurement.

The granules comprise particles of surface-reacted calcium carbonate preferably having a BET specific surface area of from 1 $m^2/g$ to 200 $m^2/g$, preferably 2 $m^2/g$ to 150 $m^2/g$, more preferably 20 $m^2/g$ to 140 $m^2/g$, most preferably 40 $m^2/g$ to 70 $m^2/g$, measured using nitrogen and the BET method according to ISO 9277:2010.

It is further preferred that the granules comprise particles of surface-reacted calcium carbonate having a volume median grain diameter $d_{50}$ of from 0.5 to 50 µm, preferably from 0.7 to 25 µm, more preferably 0.8 to 20 µm, particularly 1 to 10 µm, measured by using laser diffraction.

According to an exemplary embodiment, the granules comprise particles of surface-reacted calcium carbonate having a) a volume median grain diameter $d_{50}$ of 0.5 to 50 µm, preferably from 0.7 to 25 µm, more preferably 0.8 to 20 µm, particularly 1 to 10 µm, measured by using laser diffraction, and/or b) a BET specific surface area of from 1 $m^2/g$ to 200 $m^2/g$, preferably 2 $m^2/g$ to 150 $m^2/g$, more preferably 20 $m^2/g$ to 140 $m^2/g$, most preferably 40 $m^2/g$ to 70 $m^2/g$, measured using nitrogen and the BET method according to ISO 9277:2010.

Preferably, the granules comprise particles of surface-reacted calcium carbonate having a) a volume median grain diameter $d_{50}$ of 0.5 to 50 µm, preferably from 0.7 to 25 µm, more preferably 0.8 to 20 µm, particularly 1 to 10 µm, measured by using laser diffraction, or b) a BET specific surface area of from 1 $m^2/g$ to 200 $m^2/g$, preferably 2 $m^2/g$ to 150 $m^2/g$, more preferably 20 $m^2/g$ to 140 $m^2/g$, most preferably 40 $m^2/g$ to 70 $m^2/g$, measured using nitrogen and the BET method according to ISO 9277:2010.

Alternatively, the granules comprise particles of surface-reacted calcium carbonate having a) a volume median grain diameter $d_{50}$ of 0.5 to 50 µm, preferably from 0.7 to 25 µm, more preferably 0.8 to 20 µm, particularly 1 to 10 µm, measured by using laser diffraction, and b) a BET specific surface area of from 1 $m^2/g$ to 200 $m^2/g$, preferably 2 $m^2/g$ to 150 $m^2/g$, more preferably 20 $m^2/g$ to 140 $m^2/g$, most preferably 40 $m^2/g$ to 70 $m^2/g$, measured using nitrogen and the BET method according to ISO 9277:2010.

It may furthermore be preferred that the granules comprise particles of surface-reacted calcium carbonate having a volume particle diameter $d_{98}$ (or $d_{98}$ (vol)) of from 2 to 150 µm, preferably from 4 to 100 µm, more preferably 6 to 80 µm, even more preferably from 8 to 60 µm, and most preferably from 10 to 30 µm.

It is further preferred that the granules comprise particles of surface-reacted calcium carbonate having an intra-particle intruded specific pore volume within the range from 0.15 to 1.60 $cm^3/g$, preferably from 0.30 to 1.50 $cm^3/g$, more preferably from 0.30 to 1.40 $cm^3/g$, and most preferably from 0.30 to 1.35 $cm^3/g$, calculated from a mercury intrusion porosimetry measurement.

According to an exemplary embodiment, the granules comprise particles of surface-reacted calcium carbonate having

23 a) a volume median grain diameter $d_{50}$ of 0.5 to 50 μm, preferably from 0.7 to 25 μm, more preferably 0.8 to 20 μm, particularly 1 to 10 μm, measured by using laser diffraction, and/or b) a BET specific surface area of from 1 $m^2/g$ to 200 $m^2/g$, preferably 2 $m^2/g$ to 150 $m^2/g$, more preferably 20 $m^2/g$ to 140 $m^2/g$, most preferably 40 $m^2/g$ to 70 $m^2/g$, measured using nitrogen and the BET method according to ISO 9277:2010, and/or c) an intra-particle intruded specific pore volume within the range from 0.15 to 1.60 $cm^3/g$, preferably from 0.30 to 1.50 $cm^3/g$, more preferably from 0.30 to 1.40 $cm^3/g$, and most preferably from 0.30 to 1.35 $cm^3/g$, and most preferably from 0.30 to 0.90 $cm^3/g$ calculated from a mercury intrusion porosimetry measurement.

Preferably, the granules comprise particles of surface-reacted calcium carbonate having a) a volume median grain diameter $d_{50}$ of 0.5 to 50 μm, preferably from 0.7 to 25 μm, more preferably 0.8 to 20 μm, particularly 1 to 10 μm, measured by using laser diffraction, or b) a BET specific surface area of from 1 $m^2/g$ to 200 $m^2/g$, preferably 2 $m^2/g$ to 150 $m^2/g$, more preferably 20 $m^2/g$ to 140 $m^2/g$, most preferably 40 $m^2/g$ to 70 $m^2/g$, measured using nitrogen and the BET method according to ISO 9277:2010, or c) an intra-particle intruded specific pore volume within the range from 0.15 to 1.60 $cm^3/g$, preferably from 0.30 to 1.50 $cm^3/g$, more preferably from 0.30 to 1.40 $cm^3/g$, and most preferably from 0.30 to 1.35 $cm^3/g$, and most preferably from 0.30 to 0.90 $cm^3/g$, calculated from a mercury intrusion porosimetry measurement.

Alternatively, the granules comprise particles of surface-reacted calcium carbonate having a) a volume median grain diameter $d_{50}$ of 0.5 to 50 μm, preferably from 0.7 to 25 μm, more preferably 0.8 to 20 μm, particularly 1 to 10 μm, measured by using laser diffraction, and b) a BET specific surface area of from 1 $m^2/g$ to 200 $m^2/g$, preferably 2 $m^2/g$ to 150 $m^2/g$, more preferably 20 $m^2/g$ to 140 $m^2/g$, most preferably 40 $m^2/g$ to 70 $m^2/g$, measured using nitrogen and the BET method according to ISO 9277:2010, and c) an intra-particle intruded specific pore volume within the range from 0.15 to 1.60 $cm^3/g$, preferably from 0.30 to 1.50 $cm^3/g$, more preferably from 0.30 to 1.40 $cm^3/g$, and most preferably from 0.30 to 1.35 $cm^3/g$, calculated from a mercury intrusion porosimetry measurement.

In one embodiment, the granules comprise at least one disintegrant or any compound that may act as disintegrant. For example, the at least one disintegrant is selected from the group comprising sodium croscarmellose, modified cellulose gums, insoluble cross-linked polyvinylpyrrolidones, starches, modified starches, starch glycolates such as sodium starch glycolate, micro crystalline cellulose, pregelatinized starch, sodium carboxymethyl starch, low-substituted hydroxypropyl cellulose, homopolymers of N-vinyl-2-pyrrolidone, alkyl-, hydroxyalkyl-, carboxyalkyl-cellulose esters, alginic acid, microcrystalline cellulose and its polymorphic forms, ion exchange resins, gums, chitin, chitosan, clays, gellan gum, crosslinked polacrilin copolymers, agar, gelatine, dextrines, acrylic acid polymers, carboxymethyl-cellulose sodium/calcium, hydroxypropyl methyl cellulose phthalate, shellac, effervescent mixtures such as bicarbonates in combination with one or more acids, e.g. citric acid or tartaric acid, or mixtures thereof.

If present, the granules comprise the at least one disintegrant (or any compound that may act as disintegrant) in an amount ranging from 0.25 to 35 wt.-%, preferably of from 0.5 to 15 wt.-%, more preferably of from 0.5 to 10 wt.-%, even more preferably of from 0.7 to 10 wt.-%, most preferably of from 0.8 to 10 wt.-%, based on the total dry weight of the granules. In one embodiment, the granules comprise the at least one disintegrant (or any compound that may act as disintegrant) in an amount ranging from 0.25 to 35 wt.-%, preferably of from 0.5 to 15 wt.-%, more preferably of from 0.5 to 10 wt.-%, even more preferably of from 1.0 to 10 wt.-%, most preferably of from 1.5 to 10 wt.-%, based on the total dry weight of the granules. It is specifically preferred that the granules comprise the at least one disintegrant (or any compound that may act as disintegrant) in an amount ranging from 0.8 to 8 wt.-%, preferably of from 0.8 to 6 wt.-%, more preferably of from 0.8 to 5 wt.-%, and most preferably of from 0.8 to 4 wt.-%, based on the total dry weight of the granules.

It is appreciated that the granules are preferably obtained by a method as defined herein.

Thus, the granules are preferably obtained by a method comprising the steps of a) providing an aqueous suspension comprising a surface-reacted calcium carbonate, wherein the surface-reacted calcium carbonate is a reaction product of natural ground or precipitated calcium carbonate with carbon dioxide and one or more acids, wherein the carbon dioxide is formed in situ by the acid treatment and/or is supplied from an external source, preferably the carbon dioxide is formed in situ by the acid treatment;

b) homogenizing the aqueous suspension comprising a surface-reacted calcium carbonate of step a), and c) removing the liquid from the aqueous suspension comprising a surface-reacted calcium carbonate of step b) by means of spray drying for obtaining granules comprising surface-reacted calcium carbonate.

If the granules comprise at least one disintegrant (or any compound that may act as disintegrant), the granules are preferably obtained by a method comprising the steps of a) providing an aqueous suspension comprising a surface-reacted calcium carbonate, wherein the surface-reacted calcium carbonate is a reaction product of natural ground or precipitated calcium carbonate with carbon dioxide and one or more acids, wherein the carbon dioxide is formed in situ by the acid treatment and/or is supplied from an external source, preferably the carbon dioxide is formed in situ by the acid treatment;

b) homogenizing the aqueous suspension comprising a surface-reacted calcium carbonate of step a), c) removing the liquid from the aqueous suspension comprising a surface-reacted calcium carbonate of step b) by means of spray drying for obtaining granules comprising surface-reacted calcium carbonate, and d) adding at least one disintegrant (or any compound that may act as disintegrant) before and/or during and/or after step b) into the aqueous suspension.

Additionally or alternatively, the granules are subjected to a treatment with the at least one active ingredient and/or inactive precursor thereof such that the at least one active ingredient and/or inactive precursor thereof is substantially only present on the outer surface of the granules.

The term "active ingredient" in the meaning of the present invention refers to a substance having a specific effect in an organism and causing a specific reaction in humans, animals, microorganisms and/or plants.

It is preferred that the at least one active ingredient and/or inactive precursor thereof is/are provided in liquid form.

The term "liquid" in the meaning of the present invention refers to a non-gaseous fluid composition, comprising or consisting of the at least one active ingredient and/or inactive precursor thereof, which is readily flowable at the pressure conditions and temperature of use, i.e. the pressure and temperature at which the granules are mixed with the at least one active ingredient and/or inactive precursor thereof.

Thus, it is appreciated that the at least one active ingredient and/or inactive precursor thereof can be liquid in a temperature range from 5 to 200° C., preferably from 10 to 120° C. and most preferably from 10 to 100° C. For example, the at least one active ingredient and/or inactive precursor thereof can be liquid in a temperature range from 5 to 200° C., preferably from 10 to 120° C. and most preferably from 10 to 100° C. at ambient pressure conditions, i.e. at atmospheric pressure. Alternatively, the at least one active ingredient and/or inactive precursor thereof can be liquid in a temperature range from 5 to 200° C., preferably from 10 to 120° C. and most preferably from 10 to 100° C. at reduced pressure conditions, e.g. a pressure of from 100 to 700 mbar.

In one embodiment, the at least one active ingredient and/or inactive precursor thereof is/are liquid at ambient temperature and pressure conditions, e.g., at room temperature, such as from about 5 to 35° C., preferably from 10 to 30° C. and most preferably from 15 to 25° C., and at atmospheric pressure.

Alternatively, the at least one active ingredient and/or inactive precursor thereof is/are molten at the temperature of use, e.g. from about 35 to 200° C., preferably from 45 to 120° C. and most preferably from 55 to 100° C., and at ambient pressure conditions, i.e. at atmospheric pressure, or at reduced pressure conditions, e.g. a pressure of from 100 to 700 mbar.

Alternatively, the at least one active ingredient and/or inactive precursor thereof is/are dissolved in a solvent. That is to say, the at least one active ingredient and/or inactive precursor thereof and the solvent form a system in which no discrete solid particles are observed in the solvent and thus form a "solution".

In one embodiment of the present invention, the solvent is selected from the group comprising water, methanol, ethanol, n-butanol, isopropanol, n-propanol, acetone, dimethylsulphoxide, dimethylformamide, tetrahydrofurane, vegetable oils and the derivatives thereof, animal oils and the derivatives thereof, molten fats and waxes, and mixtures thereof. Preferably, the solvent is water, ethanol and/or acetone. More preferably, the solvent is water.

For example, the at least one active ingredient and/or inactive precursor thereof may be a chiral compound. Thus, the at least one active ingredient and/or inactive precursor thereof encompass the (R)-enantiomer, (S)-enantiomer and mixtures thereof, e.g. the racemic mixture.

Additionally or alternatively, the at least one active ingredient and/or inactive precursor thereof may be an isomeric compound. Thus, the at least one active ingredient and/or inactive precursor thereof encompass the (Z)-isomer, (E)-isomer and mixtures thereof. For example, if it is stated that the active ingredient is cinnamaldehyde, the cinnamaldehyde may be present as (Z)-cinnamaldehyde and/or (E)-cinnamaldehyde.

For example, the at least one active ingredient and/or inactive precursor thereof is selected from the group comprising fragrances, flavours, herbal extracts and oils, fruit extracts and oils, nutrients, trace minerals, repellents, food, cosmetics, flame retardants, enzymes, macromolecules, pesticides, fertilizers, preserving agents, antioxidants, reactive chemicals, pharmaceutical and/or nutraceutical and/or veterinary active agents or pharmaceutical and/or nutraceutical and/or veterinary inactive precursors of synthetic origin, semi-synthetic origin, natural origin thereof, and mixtures thereof.

Fragrances are preferably alcohols, aldehydes and/or ketones having a molecular weight of at least about 100 g/mol and which are useful in imparting an odour, fragrance, essence, or scent either alone or in combination with other fragrances. For example, the fragrance can be selected from the group comprising 2,4-dimethyl-3-cyclohexene-1-methanol (floralol), 2,4-dimethyl cyclohexane methanol (dihydro floralol), 5,6-dimethyl-1-methylethenylbicyclo[2.2.1]hept-5-ene-2-methanol (arbozol), α,α,-4-trimethyl-3-cyclohexen-1-methanol (α-terpineol), 2,4,6-trimethyl-3-cyclohexene-1-methanol (isocyclo geraniol), 4-(1-methylethyl) cyclohexane methanol (mayol), α-3,3-trimethyl-2-norborane methanol, 1,1-dimethyl-1-(4-methylcyclohex-3-enyl)methanol, 2-phenylethanol, 2-cyclohexyl ethanol, 2-(o-methylphenyl)-ethanol, 2-(m-methylphenyl)ethanol, 2-(p-methylphenyl)ethanol, 6,6-dimethylbicyclo-[3.1.1]hept-2-ene-2-ethanol (nopol), 2-(4-methylphenoxy)-ethanol, 3,3-dimethyl-Δ$^2$-β-norbornane ethanol (patchomint), 2-methyl-2-cyclohexylethanol, 1-(4-isopropylcyclohexyl)-ethanol, 1-phenylethanol, 1,1-dimethyl-2-phenylethanol, 1,1-dimethyl-2-(4-methyl-phenyl)ethanol, 1-phenylpropanol, 3-phenylpropanol, 2-phenylpropanol (Hydrotropic Alcohol), 2-(cyclododecyl)propan-1-ol (Hydroxy-ambran), 2,2-dimethyl-3-(3-methylphenyl)-propan-1-ol (Majantol), 2-methyl-3-phenylpropanol, 3-phenyl-2-propen-1-ol (cinnamyl alcohol), 2-methyl-3-phenyl-2-propen-1-ol (methyl-cinnamyl alcohol), α-n-pentyl-3-phenyl-2-propen-1-ol (α-amyl-cinnamyl alcohol), ethyl-3-hydroxy-3-phenyl propionate, 2-(4-methylphenyl)-2-propanol, 3-(4-methylcyclohex-3-ene)butanol, 2-methyl-4-(2,2,3-trimethyl-3-cyclopenten-1-yl)butanol, 2-ethyl-4-(2,2,3-trimethyl-cyclopent-3-enyl)-2-buten-1-ol, 3-methyl-2-buten-1-ol (prenyl), 2-methyl-4-(2,2,3-trimethyl-3-cyclopenten-1-yl)-2-buten-1-ol, ethyl 3-hydroxybutyrate, 4-phenyl-3-buten-2-ol, 2-methyl-4-phenylbutan-2-ol, 4-(4-hydroxyphenyl)butan-2-one, 4-(4-hydroxy-3-methoxyphenyl)-butan-2-one, 3-methyl-pentanol, 3-methyl-3-penten-1-ol, 1-(2-propenyl) cyclopentan-1-ol (plinol), 2-methyl-4-phenylpentanol (Pamplefleur), 3-methyl-5-phenylpentanol (Phenoxanol), 2-methyl-5-phenylpentanol, 2-methyl-5-(2,3-dimethyltricyclo[2.2.1.0.sup.(2,6)]hept-3-yl)-2-penten-1-ol (santalol), 4-methyl-1-phenyl-2-pentanol, 5-(2,2,3-trimethyl-3-cyclopentenyl)-3-methylpentan-2-ol (sandalore), (1-methyl-bicyclo[2.1.1]hepten-2-yl)-2-methylpent-1-en-3-ol, 3-methyl-1-phenylpentan-3-ol, 1,2-dimethyl-3-(1-methylethenyl) cyclopentan-1-ol, 2-isopropyl-5-methyl-2-hexenol, cis-3-hexen-1-ol, trans-2-hexen-1-ol, 2-isoproenyl-4-methyl-4-hexen-1-ol (Lavandulol), 2-ethyl-2-prenyl-3-hexenol, 1-hydroxymethyl-4-iso-propenyl-1-cyclohexene (Dihydrocuminyl alcohol), 1-methyl-4-isopropenylcyclohex-6-en-2-ol (carvenol), 6-methyl-3-isopropenylcyclohexan-1-ol (dihydrocarveol), 1-methyl-4-iso-propenylcyclohexan-3-ol, 4-isopropyl-1-methylcyclohexan-3-ol, 4-tert-butylcyclohexanol, 2-tert-butylcyclohexanol, 2-tert-butyl-4-methylcyclohexanol (rootanol), 4-isopropyl-cyclohexanol, 4-methyl-1-(1-methylethyl)-3-cyclohexen-1-ol, 2-(5,6,6-trimethyl-2-norbornyl)cyclohexanol, isobornylcyclohexanol, 3,3,5-trimethylcyclohexanol, 1-methyl-4-isopropylcyclohexan-3-ol, 1-methyl-4-isopropylcyclohexan-8-ol (dihydroterpineol), 1,2-dimethyl-3-(1-methylethyl)cyclohexan-1-ol, heptanol, 2,4-dimethylheptan-1-ol, 6-heptyl-5-hepten-2-ol (iso-linalool), 2,4-dimethyl-2,6-heptandienol, 6,6-dimethyl-2-oxymethyl-bicyclo[3.1.1]hept-2-ene (myrtenol), 4-methyl-2,4-heptadien-1-ol, 3,4,5,6,6-pentamethyl-2-heptanol, 3,6-dimethyl-3-vinyl-5-hepten-2-ol, 6,6-dimethyl-3-hydroxy-2-methylenebicyclo[3.1.1]heptane, 1,7,7-trimethylbicyclo[2.2.1]heptan-2-ol, 2,6-dimethylheptan-2-ol (dimetol), 2,6,6-trimethylbicyclo[1.3.3]heptan-2-ol, octanol, 2-octenol, 2-methyloctan-2-ol, 2-methyl-6-methylene-7-octen-2-ol (myrcenol), 7-methyloctan-1-ol, 3,7-dimethyl-6-octenol, 3,7-dimethyl-7-octenol, 3,7-dimethyl-6-octen-1-ol (citronellol), 3,7-dimethyl-2,6-octadien-1-ol (geraniol), 3,7-dimethyl-2,6-octadien-1-ol (nerol), 3,7-dimethyl-7-methoxyoctan-2-ol (osyrol), 3,7-dimethyl-1,6-octadien-3-ol (linalool), 3,7-dimethyloctan-1-ol (pelargol), 3,7-dimethyloctan-3-ol (tetrahydrolinalool), 2,4-octadien-1-ol, 3,7-dimethyl-6-octen-3-ol (dihydrolinalool), 2,6-dimethyl-7-octen-2-ol (dihydromyrcenol), 2,6-dimethyl-5,7-octadien-2-ol, 4,7-dimethyl-4-vinyl-6-octen-3-ol, 3-methyloctan-3-ol, 2,6-dimethyloctan-2-ol, 2,6-dimethyloctan-3-ol, 3,6-dimethyloctan-3-ol, 2,6-dimethyl-7-octen-2-ol, 2,6-dimethyl-3,5-octadien-2-ol (muguol), 3-methyl-1-octen-3-ol, 7-hydroxy-3,7-dimethyloctanal, 3-nonanol, 2,6-nonadien-1-ol, cis-6-nonen-1-ol, 6,8-dimethylnonan-2-ol, 3-(hydroxymethyl)-2-nonanone, 2-nonen-1-ol, 2,4-nonadien-1-ol, 3,7-dimethyl-1,6-nonadien-3-ol, decanol, 9-decenol, 2-benzyl-M-dioxa-5-ol, 2-decen-1-ol, 2,4-decadien-1-ol, 4-methyl-3-decen-5-ol, 3,7,9-trimethyl-1,6-decadien-3-ol (isobutyl linalool), undecanol, 2-undecen-1-ol, 10-undecen-1-ol, 2-dodecen-1-ol, 2,4-dodecadien-1-ol, 2,7,11-trimethyl-2,6,10-dodecatrien-1-ol (farnesol), 3,7,11-trimethyl-1,6,10,-dodecatrien-3-ol (nerolidol), 3,7,11,15-tetramethylhexadec-2-en-1-ol (phytol), 3,7,11,15-tetramethylhexadec-1-en-3-ol (iso phytol), benzyl alcohol, p-methoxy benzyl alcohol (anisyl alcohol), para-cymen-7-ol (cuminyl alcohol), 4-methyl benzyl alcohol, 3,4-methylenedioxy benzyl alcohol, methyl salicylate, benzyl salicylate, cis-3-hexenyl salicylate, n-pentyl salicylate, 2-phenylethyl salicylate, n-hexyl salicylate, 2-methyl-5-isopropylphenol, 4-ethyl-2-methoxyphenol, 4-allyl-2-methoxyphenol (eugenol), 2-methoxy-4-(1-propenyl)phenol (isoeugenol), 4-allyl-2,6-dimethoxy-phenol, 4-tert-butylphenol, 2-ethoxy-4-methylphenol, 2-methyl-4-vinylphenol, 2-isopropyl-5-methylphenol (thymol), pentyl-ortho-hydroxy benzoate, ethyl 2-hydroxy-benzoate, methyl 2,4-dihydroxy-3,6-dimethylbenzoate, 3-hydroxy-5-methoxy-1-methylbenzene, 2-tert-butyl-4-methyl-1-hydroxybenzene, 1-ethoxy-2-hydroxy-4-propenylbenzene, 4-hydroxytoluene, 4-hydroxy-3-methoxybenzaldehyde, 2-ethoxy-4-hydroxybenzaldehyde, decahydro-2-naphthol, 2,5,5-trimethyl-octahydro-2-naphthol, 1,3,3-trimethyl-2-norbornanol (fenchol), 3a,4,5,6,7,7a-hexahydro-2,4-dimethyl-4,7-methano-1H-inden-5-ol, 3a,4,5,6,7,7a-hexahydro-3,4-dimethyl-4,7-methano-1H-inden-5-ol, 2-methyl-2-vinyl-5-(1-hydroxy-1-methylethyl)tetrahydrofuran, β-caryophyllene alcohol, vanillin, ethyl vanillin, cinnamaldehyde, benzaldehyde, phenyl acetaldehyde, heptylaldehyde, octylaldehyde, decylaldehyde, undecylaldehyde, undecylenic aldehyde, dodecylaldehyde, tridecylaldehyde, methylnonyl aldehyde, didecylaldehyde, anisaldehyde, citronellal, citronellyloxyaldehyde, cyclamen aldehyde, α-hexyl cinnamaldehyde, hydroxycitronellal, α-methyl cinnamaldehyde, methylnonyl acetaldehyde, propylphenyl aldehyde, citral, perilla aldehyde, tolylaldehyde, tolylacetaldehyde, cuminaldehyde, LILIAL®, salicyl aldehyde, α-amylcinnamaldehyde and heliotropin and mixtures thereof.

Various essential oils, herbal extracts and/or fruit extracts may also be used, preferably those with various medicinal or dietary supplement properties. Essential oils, herbal extracts and/or fruit extracts are generally extracts or aromatic plants, plant parts, fruit or fruit parts that can be used medicinally or for flavouring. Suitable herbal extracts and/or fruit extracts can be used singly or in various mixtures. Commonly used essential oils, herbal extracts and/or fruit extracts include Echinacea, Goldenseal, Calendula, Rosemary, Thyme, Kava Kava, Aloe, Blood Root, Grapefruit Seed Extract, Black Cohosh, Ginseng, Guarana, Cranberry, Ginko Biloba, St. John's Wort, Evening Primrose Oil, Yohimbe Bark, Green Tea, Ma Huang, Maca, Bilberry, Lutein, Ginger, eugenol-containing oils and combinations thereof.

A variety of nutrients may be used including virtually any vitamin, mineral and/or phytochemical. For example, vitamin A, vitamin B1, vitamin B6, vitamin B12, vitamin B2, vitamin B6, vitamin D, vitamin E, i.e. tocopheroles, vitamin K, thiamine, riboflavin, biotin, folic acid, niacin, pantothenic acid, Q10, alpha lipoic acid, dihydrolipoic acid, curcumin, xanthophylls, beta cryptoxanthin, lycopene, lutein, zeaxanthin, astaxanthin, beta-carotene, carotenes, mixed carotenoids, polyphenols, flavonoids, sodium, potassium, calcium, magnesium, sulphur, chlorine, choline, and/or phytochemicals such as carotenoids, chlorophyll, chlorophyllin, fibre, flavanoids, anthocyanins, cyaniding, delphinidin, malvidin, pelargonidin, peonidin, petunidin, flavanols, catechin, epicatechin, epigallocatechin, epigallocatechingallate, theaflavins, thearubigins, proanthocyanins, flavonols, quercetin, kaempferol, myricetin, isorhamnetin, flavononeshesperetin, naringenin, eriodictyol, tangeretin, flavones, apigenin, luteolin, lignans, phytoestrogens, resveratrol, isoflavones, daidzein, genistein, glycitein, soy isoflavones, and combinations thereof, may be used. Examples of nutrients that can be used as active ingredient(s) are set forth in U.S. Patent Application Publication Nos. 20030157213 A1, 20030206993 and 20030099741 A1 which are incorporated in their entirety herein by reference for all purposes.

In one embodiment, trace minerals can be used, e.g. manganese, zinc, copper, fluorine, molybdenum, iodine, cobalt, chromium, selenium, phosphorous, and combinations thereof Enzymes can include but are not limited to coenzyme Q10, pepsin, phytase, trypsin, lipases, proteases, cellulases, lactase and combinations thereof.

Pesticides are preferably any known herbicide, insecticide, insect growth regulator, nematicide, termiticide, molluscicide, piscicide, avicide, rodenticide, predacide, bactericide, insect repellent, animal repellent, antimicrobial, fungicide, disinfectant (antimicrobial), and sanitizer known to the skilled person.

It is to be noted that the preserving agent may be any such compound known to the skilled person. For example, preserving agents may include, but are not limited to, phenoxyethanol, ethylhexylglycerin, parabens such as methyl paraben, ethyl paraben, propyl paraben, butyl paraben and mixtures thereof, benzalkonium chloride, chlorbutanol, benzyl alcohol, cetylpyridinium chloride, tartaric acid, lactic acid, malic acid, acetic acid, benzoic acid, sodium benzoate, sorbic acid, potassium sorbate and mixtures thereof.

Antioxidants are preferably selected from the group comprising butylhydroxyanisol (BHA), butylhydroxytoluol (BHT), gallate, carotinoid, polyphenols such as resveratrol, flavonoid and mixtures thereof, derivatives of polyphenols, tocopherol and salts thereof, betacarotin, ubichinon, tocotrienol, dihydroquercetin, antioxidants of natural origin and mixtures thereof. If the antioxidant is of natural origin, the antioxidant can be e.g. a conifer extract, pinus pinaster bark extract such as Pycnogenol® from Horphag, Switzerland, and/or emblica officinalis fruit extract such as Saberry® from Sabinsa corporation, Germany.

The pharmaceutically active agent or pharmaceutically inactive precursor thereof is preferably selected from the group comprising pharmaceutically active agent or pharmaceutically inactive precursor of synthetic origin, semi-synthetic origin, natural origin and combinations thereof.

Thus, a pharmaceutically active agent refers to pharmaceutically active agents which are of synthetic origin, semi-synthetic origin, natural origin and combinations thereof. Further, a pharmaceutically inactive precursor of the pharmaceutically active agent refers to pharmaceutically inactive precursors which are of synthetic origin, semi-synthetic origin, natural origin and combinations thereof and will be activated at a later stage to the respective pharmaceutically active agent.

The activation of such pharmaceutically inactive precursor is known to the skilled person and commonly in use, e.g. activation in the stomach and/or gastro-intestinal pathway-such as acidic activation or tryptic- or chimotryptic cleavage.

It lies within the understanding of the skilled person that the mentioned activation methods are of mere illustrative character and are not intended to be of limiting character.

It is to be noted that the pharmaceutically active agent or pharmaceutically inactive precursor thereof, may be any such compound known to the skilled person.

Pharmaceutically active agents thus include any compound that provides prophylactic and/or therapeutic properties when administered to humans and/or animals. Examples include, but are not limited to, pharmaceutical actives, therapeutic actives, veterinarian actives, nutraceuticals, and growth regulators.

The pharmaceutically active agent or pharmaceutically inactive precursor thereof can be an anti-inflammatory agent. Such agents may include, but are not limited to, non-steroidal anti-inflammatory agents or NSAIDs, such as propionic acid derivatives; acetic acid derivatives; fenamic acid derivatives; biphenylcarboxylic acid derivatives; and oxicams. All of these NSAIDs are fully described in U.S. Pat. No. 4,985,459 to Sunshine et al., incorporated by reference herein in its entirety as to the description of such NSAIDs. Examples of useful NSAIDs include acetylsalicylic acid, ibuprofen, naproxen, benoxaprofen, flurbiprofen, fenoprofen, fenbufen, ketoprofen, indoprofen, pirprofen, carprofen, oxaprozin, pranoprofen, microprofen, tioxaprofen, suprofen, alminoprofen, tiaprofenic acid, fluprofen, bucloxic acid and mixtures thereof. Also useful are the steroidal anti-inflammatory drugs such as hydrocortisone and the like, and COX-2 inhibitors such as meloxicam, celecoxib, rofecoxib, valdecoxib, etoricoxib or mixtures thereof. Mixtures of any of the above anti-inflammatories may be used.

Other materials that can be used as pharmaceutically active agent or pharmaceutically inactive precursor thereof include commonly known mouth and throat products. These products include, but are not limited to, upper respiratory agents such as phenylephrine, diphenhydramine, dextromethorphan, bromhexine and chlorpheniramine, gastro-intestinal agents such as famotidine, loperamide and simethicone, anti-fungals such as miconazole nitrate, antibiotics and analgesics such as ketoprofen and fluribuprofen.

The pharmaceutically active agent or pharmaceutically inactive precursor thereof may be also selected from sodium pyrosulphite, butylhydroxytoluene, butylated hydroxyanisole.

The pharmaceutically active agent or pharmaceutically inactive precursor thereof may be also selected from ephedrine, magaldrate, pseudoephedrine, sildenafil, xylocaine, benzalconium chloride, caffeine, phenylephrine, amfepramone, orlistat, sibutramine, acetaminophen, aspirin, glitazones, metformin, chlorpromazine, dimenhydrinat, domperidone, meclozine, metoclopramide, odansetron, prednisolone, promethazine, acrivastine, cetirizine, cinnarizine, clemastine, cyclizine, desloratadine, dexchlorpheniramine, dimenhydrinate, ebastine, fexofenadine, ibuprofen, levolevoproricin, loratadine, meclozine, mizolastine, promethazine, miconazole, chlorhexidine diacetate, fluoride, decapeptide KSL, aluminium fluoride, aminochelated calcium, ammonium fluoride, ammonium fluorosilicate, ammonium monofluorphosphate, calcium fluoride, calcium gluconate, calcium glycerophosphate, calcium lactate, calcium monofluorphosphate, calciumcarbonate, carbamide, cetyl pyridinium chloride, chlorhexidine, chlorhexidine digluconate, chlorhexidine chloride, chlorhexidine diacetate, CPP caseine phospho peptide, hexetedine, octadecentyl ammonium fluoride, potassium fluorosilicate, potassium chloride, potassium monofluorphosphate, sodium bi carbonate, sodium carbonate, sodium fluoride, sodium fluorosilicate, sodium monofluorphosphate, sodium tri polyphosphate, stannous fluoride, stearyl trihydroxyethyl propylenediamine dihydrofluoride, strontium chloride, tetra potassium pyrophosphate, tetra sodium pyrophosphate, tripotassium orthophosphate, trisodium orthophosphate, alginic acid, aluminium hydroxide, sodium bicarbonate, sildenafil, tadalafil, vardenafil, yohimbine, cimetidine, nizatidine, ranitidine, acetylsalicylic acid, clopidogrel, acetylcysteine, bromhexine, codeine, dextromethorphan, diphenhydramine, noscapine, phenylpropanolamine, vitamin D, simvastatin, bisacodyl, lactitol, lactulose, magnesium oxide, sodium picosulphate, senna glycosides, benzocaine, lidocaine, tetracaine, almotriptan, eletriptan, naratriptan, rizatriptan, sumatriptan, zolmitriptan, calcium, chromium, copper, iodine, magnesium, manganese, molybdenium, phosphor, selenium, zinc, chloramine, hydrogenperoxide, metronidazole, triamcinolonacetonide, benzethonium chl., cetyl pyrid. chl., chlorhexidine, fluoride, lidocaine, amphotericin, miconazole, nystatin, fish oil, ginkgo biloba, ginseng, ginger, purple coneflower, saw palmetto, cetirizine, levocetirizine, loratadine, diclofenac, flurbiprofen, acrivastine pseudoephedrine, loratadine pseudoephedrine, glucosamine, hyaluronic acid, decapeptide KSL-W, decapeptide KSL, resveratrol, misoprostol, bupropion, ondansetron HCl, esomeprazole, lansoprazole, omeprazole, pantoprazole, rabeprazole, bacteria and the like, loperamide, simethicone, acetylsalicylic acid and others, sucralfate, clotrimazole, fluconazole, itraconazole, ketoconazole, terbinafine, allopurinol, probenecid, atorvastatin, fluvastatin, lovastatin, nicotinic acid, pravastatin, rosuvastatin, simvastatin, pilocarpine, naproxen, alendronate, etidronate, raloxifene, risedronate, benzodiazepines, disulphiram, naltrexone, buprenorphine, codeine, dextropropoxyphene, fentanyl, hydromorphone, ketobemidone, ketoprofen, methadone, morphine, naproxen, nicomorphine, oxycodone, pethidine, tramadol, amoxicillin, ampicillin, azithromycin, ciprofloxacin, clarithromycin, doxycyclin, erythromycin, fusidic acid, lymecycline, metronidazole, moxifloxacin, ofloxacin, oxytetracycline, phenoxymethylpenicillin, rifamycins, roxithromycin, sulphamethizole, tetracycline, trimethoprim, vancomycin, acarbose, glibenclamide, gliclazide, glimepiride, glipizide, insulin, repaglinide, tolbutamide, oseltamivir, aciclovir, famciclovir, penciclovir, valganciclovir, amlopidine, diltiazem, felodipine, nifedipine, verapamil, finasteride, minoxidil, cocaine, buphrenorphin, clonidine, methadone, naltrexone, calcium antagonists, clonidine, ergotamine, β-blockers, aceclofenac, celecoxib, dexiprofen, etodolac, indometacin, ketoprofen, ketorolac, lornoxicam, meloxicam, nabumetone, oiroxicam, parecoxib, phenylbutazone, piroxicam, tiaprofenic acid, tolfenamic acid, aripiprazole, chlorpromazine, chlorprothixene, clozapine, flupentixol, fluphenazine, haloperidol, lithium carbonate, lithium citrate, melperone, penfluridol, periciazine, perphenazine, pimozide, pipamperone, prochlorperazine, risperidone, thioridizin, fluconazole, itraconazole, ketoconazole, voriconazole, opium, benzodiazepines, hydroxine, meprobamate, phenothiazine, aluminiumaminoacetate, esomeprazole, famotidine, magnesium oxide, nizatide, omeprazole, pantoprazole, fluconazole, itraconazole, ketoconazole, metronidazole, amphetamine, atenolol, bisoprolol fumarate, metoprolol, metropolol, pindolol, propranolol, auranofin, and bendazac.

Further examples of useful pharmaceutically active agents or pharmaceutically inactive precursors thereof can include active ingredients selected from the therapeutical groups comprising: Analgesic, Anaesthetic, Antipyretic, Anti-allergic, Anti-arrhythmic, Appetite suppressant, Antifungal, Anti-inflammatory, Broncho dilator, Cardiovascular drugs, Coronary dilator, Cerebral dilator, Peripheral vasodilator, Anti-infective, Psychotropic, Anti-manic, Stimulant, Antihistamine, Laxative, Decongestant, Gastro-intestinal sedative, Sexual dysfunction agent, Disinfectants, Anti-diarrhoeal, Anti-anginal substance, Vasodilator, Anti-hypertensive agent, Vasoconstrictor, Migraine treating agent, Antibiotic, Tranquilizer, Antipsychotic, Anti-tumour drug, Anticoagulant, Antithrombotic agent, Hypnotic, Sedative, Anti-emetic, Anti-nauseant, Anticonvulsant, Neuromuscular agent, Hyper and hypoglycaemic, Thyroid and antithyroid, Diuretic, Antispasmodic, Uterine relaxant, Anti-obesity agent, Anorectic, Spasnolytics, Anabolic agent, Erythropoietic agent, Anti-asthmatic, Expectorant, Cough suppressant, Mucolytic, Anti-uricemic agent, Dental vehicle, Breath freshener, Antacid, Anti-diuretic, Anti-flatulent, Betablocker, Teeth Whitener, Enzyme, Co-enzyme, Protein, Energy booster, Fibre, Probiotics, Prebiotics, NSAID, Anti-tussives, Decongestants, Anti-histamines, Expectorants, Anti-diarrhoeals, Hydrogen antagonists, Proton pump inhibitors, General nonselective CNS depressants, General nonselective CNS stimulants, Selectively CNS function modifying drugs, Antiparkinsonism, Narcotic-analgetics, Analgetic-antipyretics, Psychopharmacological drugs, and Sexual dysfunction agents.

Examples of useful pharmaceutically active agents or pharmaceutically inactive precursors thereof may also include: Casein glyco-macro-peptide (CGMP), Triclosan, Cetyl pyridinium chloride, Domiphen bromide, Quaternary ammonium salts, zinc components, Sanguinarine, Fluorides, Alexidine, Octonidine, EDTA, Aspirin, Acetaminophen, Ibuprofen, Ketoprofen, Diflunisal, Fenoprofen calcium, Naproxen, Tolmetin sodium, Indomethacin, Benzonatate, Caramiphen edisylate, Menthol, Dextromethorphan hydrobromide, Theobromine hydrochloride, Chlophendianol Hydrochloride, Pseudoephedrine Hydrochloride, Phenylephrine, Phenylpropanolamine, Pseudoephedrine sulphate, Brompheniramine maleate, Chlorpheniramine-maleate, Carbinoxamine maleate, Clemastine fumarate, Dexchlorpheniramine maleate, Dephenhydramine hydrochloride, Diphenpyralide hydrochloride, Azatadine maleate, Diphenhydramine citrate, Doxylamine succinate, Promethazine hydrochloride, Pyrilamine maleate, Tripellenamine citrate, Triprolidine hydrochloride, Acrivastine, Loratadine, Brompheniramine, Dexbrompheniamine, Guaifenesin, Ipecac, potassium iodide, Terpin hydrate, Loperamide, Famotidine, Ranitidine, Omeprazole, Lansoprazole, Aliphatic alcohols, Barbiturates, caffeine, strychnine, Picrotoxin, Pentyenetetrazol, Phenyhydantoin, Phenobarbital, Primidone, Carbamazapine, Etoxsuximide, Methsuximide, Phensuximide, Trimethadione, Diazepam, Benzodiazepines, Phenacemide, Pheneturide, Acetazolamide, Sulthiame, bromide, Levodopa, Amantadine, Morphine, Heroin, Hydromorphone, Metopon, Oxymorphone, Levophanol, Codeine, Hydrocodone, Xycodone, Nalorphine, Naloxone, Naltrexone, Salicylates, Phenylbutazone, Indomethacin, Phenacetin, Chlorpromazine, Methotrimeprazine, Haloperidol, Clozapine, Reserpine, Imipramine, Tranylcypromine, Phenelzine, Lithium, Sildenafil citrate, Tadalafil, and Vardenafil CL. For example, eugenol can be used as anaesthetic.

Examples of useful pharmaceutically active agent or pharmaceutically inactive precursor thereof may include active ingredients selected from the groups of ace-inhibitors, antianginal drugs, anti-arrhythmias, anti-asthmatics, anticholesterolemics, analgesics, anaesthetics, anticonvulsants, anti-depressants, anti-diabetic agents, anti-diarrhoea preparations, antidotes, anti-histamines, anti-hypertensive drugs, anti-inflammatory agents, anti-lipid agents, anti-manics, anti-nauseants, anti-stroke agents, anti-thyroid preparations, anti-tumour drugs, anti-viral agents, acne drugs, alkaloids, amino acid preparations, anti-tussives, anti-uricemic drugs, anti-viral drugs, anabolic preparations, systemic and non-systemic anti-infective agents, anti-neoplasties, antiparkinsonian agents, anti-rheumatic agents, appetite stimulants, biological response modifiers, blood modifiers, bone metabolism regulators, cardiovascular agents, central nervous system stimulates, cholinesterase inhibitors, contraceptives, decongestants, dietary supplements, dopamine receptor agonists, endometriosis management agents, enzymes, erectile dysfunction therapies such as sildenafil citrate, which is currently marketed as Viagra™, fertility agents, gastrointestinal agents, homeopathic remedies, hormones, hypercalcemia and hypocalcemia management agents, immunomodulators, immunosuppressives, migraine preparations, motion sickness treatments, muscle relaxants, obesity management agents, osteoporosis preparations, oxytocics, parasympatholytics, parasympathomimetics, prostaglandins, psychotherapeutic agents, respiratory agents, sedatives, smoking cessation aids such as bromocriptine, sympatholytics, tremor preparations, urinary tract agents, vasodilators, laxatives, antacids, ion exchange resins, anti-pyretics, appetite suppressants, expectorants, anti-anxiety agents, anti-ulcer agents, anti-inflammatory substances, coronary dilators, cerebral dilators, peripheral vasodilators, psycho-tropics, stimulants, anti-hypertensive drugs, vasoconstrictors, migraine treatments, antibiotics, tranquilizers, anti-psychotics, anti-tumour drugs, anti-coagulants, anti-thrombotic drugs, hypnotics, anti-emetics, anti-nauseants, anti-convulsants, neuromuscular drugs, hyper- and hypo-glycemic agents, thyroid and anti-thyroid preparations, diuretics, anti-spasmodics, terine relaxants, anti-obesity drugs, erythropoietic drugs, anti-asthmatics, cough suppressants, mucolytics, DNA and genetic modifying drugs, and combinations thereof.

Examples of useful pharmaceutically active agents or pharmaceutically inactive precursors thereof contemplated can also include antacids, H2-antagonists, and analgesics. For example, antacid dosages can be prepared using the ingredients calcium carbonate alone or in combination with magnesium hydroxide, and/or aluminium hydroxide. Moreover, antacids can be used in combination with H2-antagonists.

Analgesics include opiates and opiate derivatives, such as Oxycontin™, ibuprofen, aspirin, acetaminophen, and combinations thereof that may optionally include caffeine.

Other useful pharmaceutically active agents or pharmaceutically inactive precursors thereof can include anti-diarrhoeals such as Immodium™ AD, anti-histamines, anti-tussives, decongestants, vitamins, and breath fresheners. Also contemplated for use herein are anxiolytics such as Xanax™; anti-psychotics such as Clozaril™ and Haldol™; non-steroidal anti-inflammatories (NSAID's) such as ibuprofen, naproxen sodium, Voltaren™ and Lodine™, anti-histamines such as Claritin™ Hismanal™ Relafen™ and Tavist™; antiemetics such as Kytril™ and Cesamet™; bronchodilators such as Bentolin™, Proventil™; anti-depressants such as Prozac™, Zoloft™, and Paxil™; anti-migraines such as Imigra™ ACE-inhibitors such as Vasotec™, Capoten™ and Zestril™; anti-Alzheimer's agents, such as Nicergoline™; and CaH-antagonists such as Procardia™, Adalat™, and Calan™.

The popular H2-antagonists which are contemplated for use in the present invention include cimetidine, ranitidine hydrochloride, famotidine, nizatidine, ebrotidine, mifentidine, roxatidine, pisatidine and aceroxatidine.

Active antacid ingredients can include, but are not limited to, the following: aluminium hydroxide, dihydroxyaluminium aminoacetate, aminoacetic acid, aluminium phosphate, dihydroxyaluminium sodium carbonate, bicarbonate, bismuth aluminate, bismuth carbonate, bismuth subcarbonate, bismuth subgallate, bismuth subnitrate, bismuth subsilysilate, calcium phosphate, citrate ion (acid or salt), amino acetic acid, hydrate magnesium aluminate sulphate, magaldrate, magnesium aluminosilicate, magnesium carbonate, magnesium glycinate, magnesium hydroxide, magnesium oxide, magnesium trisilicate, milk solids, aluminium mono-ordibasic calcium phosphate, tricalcium phosphate, potassium bicarbonate, sodium tartrate, sodium bicarbonate, magnesium aluminosilicates, tartaric acids and salts.

In some embodiments, the pharmaceutically active agent or pharmaceutically inactive precursor thereof can be selected from analgesics/anaesthetics such as menthol, phenol, hexylresorcinol, benzocaine, dyclonine hydrochloride, benzyl alcohol, salicyl alcohol, and combinations thereof. In some embodiments, the pharmaceutically active agent or pharmaceutically inactive precursor thereof can be selected from demulcents such as slippery elm bark, pectin, gelatin, and combinations thereof. In some embodiments, the pharmaceutically active agent or pharmaceutically inactive precursor thereof can be selected from antiseptic ingredients such as cetylpyridinium chloride, domiphen bromide, dequalinium chloride, eugenol and combinations thereof.

In some embodiments, the pharmaceutically active agent or pharmaceutically inactive precursor thereof can be selected from antitussive ingredients such as chlophedianol hydrochloride, codeine, codeine phosphate, codeine sulphate, dextromethorphan, dextromethorphan hydrobromide, diphenhydramine citrate, and diphenhydramine hydrochloride, and combinations thereof.

In some embodiments, the pharmaceutically active agent or pharmaceutically inactive precursor thereof can be selected from throat soothing agents such as honey, propolis, aloe vera, glycerine, menthol and combinations thereof. In still other embodiments, the pharmaceutically active agent or pharmaceutically inactive precursor thereof can be selected from cough suppressants. Such cough suppressants can fall into two groups: those that alter the texture or production of phlegm such as mucolytics and expectorants; and those that suppress the coughing reflex such as codeine (narcotic cough suppressants), antihistamines, dextromethorphan and isoproterenol (non-narcotic cough suppressants).

In still other embodiments, the pharmaceutically active agent or pharmaceutically inactive precursor thereof can be an antitussive selected from the group comprising codeine, dextromethorphan, dextrorphan, diphenhydramine, hydrocodone, noscapine, oxycodone, pentoxyverine and combinations thereof. In some embodiments, the pharmaceutically active agent or pharmaceutically inactive precursor thereof can be selected from antihistamines such as acrivastine, azatadine, brompheniramine, chlorpheniramine, clemastine, cyproheptadine, dexbrompheniramine, dimenhydrinate, diphenhydramine, doxylamine, hydroxyzine, meclizine, phenindamine, phenyltoloxamine, promethazine, pyrilamine, tripelennamine, triprolidine and combinations thereof. In some embodiments, the pharmaceutically active agent or pharmaceutically inactive precursor thereof can be selected from non-sedating antihistamines such as astemizole, cetirizine, ebastine, fexofenadine, loratidine, terfenadine, and combinations thereof.

For example, the one or more active ingredient(s) is/are selected from fragrances, flavours, essential oils, insecticide, fungicide, pharmaceutically active agent, or pharmaceutically inactive precursor thereof, e.g. antiseptic and/or anaesthetic, and mixtures thereof.

If the granules comprise at least one active ingredient and/or inactive precursor thereof, the at least one active ingredient and/or inactive precursor thereof is/are preferably present in the granules in an amount from 0.5 to 80 wt.-%, preferably of from 10.0 to 70 wt.-% and most preferably of from 20 to 60 wt.-%, based on the total dry weight of the granules.

It is further to be noted that the granules of the present invention have an improved flowability, compactability as well as mechanical stability compared to granules produced by a method missing homogenizing step b).

Further to this, the granules are ready to use granules in further methods for producing dispersible dosage forms. Such dosage forms are tablets, mini-tables, pellets, capsules, jelly beans or chewing gums comprising these granules.

Further to this, the granules and the above mentioned dosage forms can be used in a nutraceutical product, agricultural product, veterinary product, cosmetic product, home product, food product, packaging product or personal care product, or as excipient in a pharmaceutical product.

It is appreciated that the cosmetic product is preferably a dry cosmetic and/or dry skin care composition, more preferably a dry cosmetic composition. For example, the dry cosmetic composition is a cosmetic powder including eye-shadow, powder makeup, lip powder, face powder, body powder or blusher. According to another embodiment, the cosmetic product is a dry skin care composition. For example, the dry skin care composition may be a skin care powder including shaving powder, body powder, baby powder, foot powder and a deodorant powder. According to yet another embodiment, the dry cosmetic and/or dry skin care composition is a dry cosmetic and skin care composition.

The personal care product is preferably an oral care composition. In one embodiment, the oral care composition is a toothpaste, a toothgel, a toothpowder, a cement, a composition carried out on a mouthstrip or a buccal adhesive patch, a (chewable) tooth tablet, a chewable pastille or a chewable gum, preferably a toothpaste, a toothpowder, a toothpowder or a (chewable) tooth tablet.

Such mini-tablets or tablets are well known in the art and are of a particle size which is typically used for the products to be prepared.

For example, the mini-tablets or tablets have a weight median particle size $d_{50}$ of from 0.1 to 20.0 mm, preferably 0.2 to 15.0 mm and more preferably from 0.3 to 10.0 mm, as measured according to mechanical sieving.

The following examples and tests will illustrate the present invention, but are not intended to limit the invention in any way.

EXAMPLES

Measurement Methods

Figure 1:
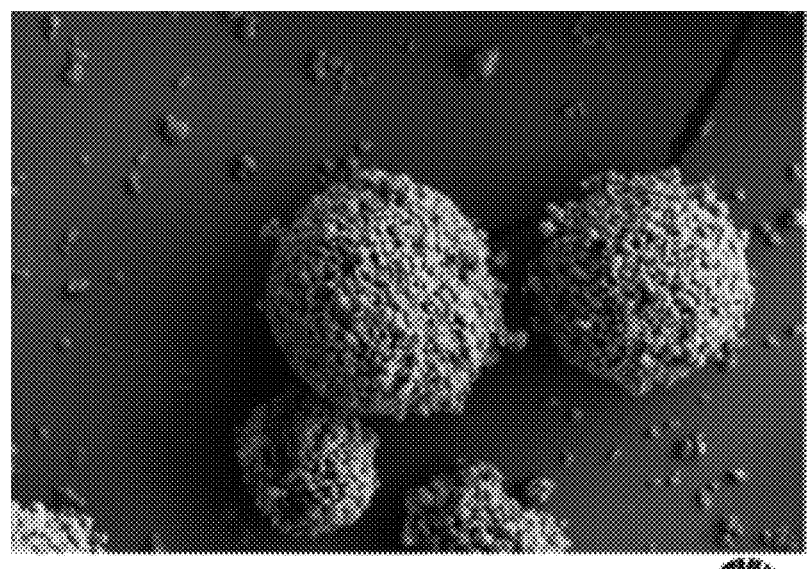
FIG. 1 shows the SEM results for the granules obtained for SRCC1 by using a homogenizer for homogenizing and a fountain nozzle for spray drying.
Figure 2:
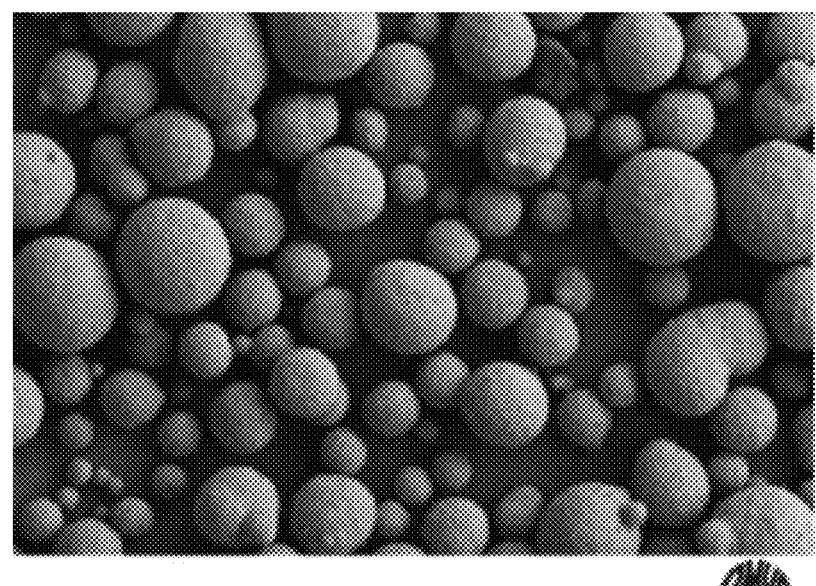
FIG. 2 shows the SEM results for the granules obtained for SRCC2 by using a homogenizer for homogenizing and a fountain nozzle for spray drying.
Figure 3:
FIG. 3 shows the SEM results for the granules obtained for SRCC3 by using a homogenizer for homogenizing and a fountain nozzle for spray drying.
Figure 4:
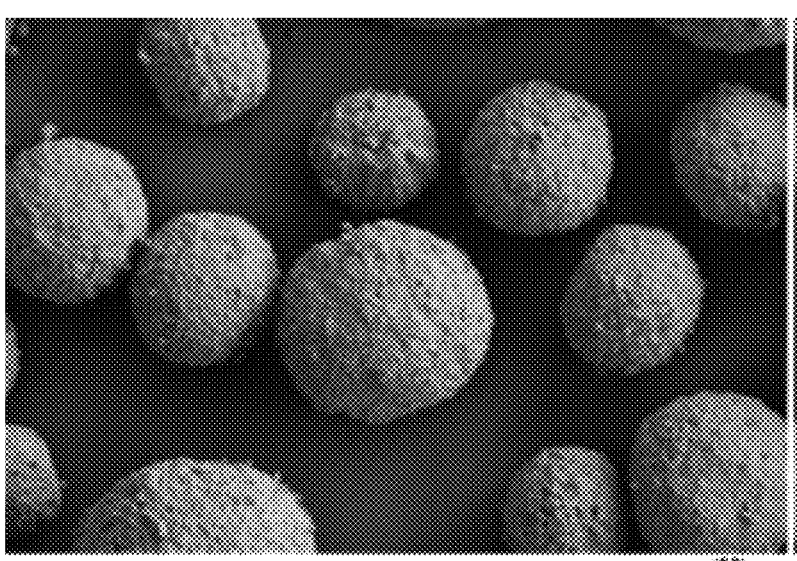
FIG. 4 shows the SEM results for the granules obtained for SRCC4 by using a homogenizer for homogenizing and a fountain nozzle for spray drying.

In the following, measurement methods implemented in the examples are described.

Particle Size Distribution

Volume determined median particle size $d_{50}$(vol) and the volume determined top cut particle size $d_{98}$(vol) as well as the volume particle sizes $d_{90}$(vol) and $d_{10}$(vol) were evaluated in a wet unit using a Malvern Mastersizer 2000 or 3000 Laser Diffraction System (Malvern Instruments Plc., Great Britain). The $d_{50}$(vol) or $d_{98}$(vol) value indicates a diameter value such that 50% or 98% by volume, respectively, of the particles have a diameter of less than this value. The raw data obtained by the measurement was analyzed using the Mie theory, with a particle refractive index of 1.57 and an absorption index of 0.005. The methods and instruments are known to the skilled person and are commonly used to determine particle size distributions of fillers and pigments. The sample was measured in dry condition without any prior treatment.

The weight determined median particle size $d_{50}$(wt) was measured by the sedimentation method, which is an analysis of sedimentation behaviour in a gravimetric field. The measurement was made with a Sedigraph™ 5120 of Micromeritics Instrument Corporation, USA. The method and the instrument are known to the skilled person and are commonly used to determine particle size distributions of fillers and pigments. The measurement was carried out in an aqueous solution of 0.1 wt.-% $Na_4P_2O_7$. The samples were dispersed using a high speed stirrer and supersonicated.

The processes and instruments are known to the skilled person and are commonly used to determine grain sizes of fillers and pigments.

If not otherwise indicated in the following example section, the volume particle sizes were evaluated in a wet unit using a Malvern Mastersizer 2000 Laser Diffraction System (Malvern Instruments Plc., Great Britain).

Specific Surface Area (SSA)

The specific surface area was measured via the BET method according to ISO 9277:2010 using nitrogen, following conditioning of the sample by heating at 110° C., when using disintegrant(s), or at 250° C., when the sample is free of disintegrant(s), for a period of 30 minutes. If the sample was in the form of an aqueous suspension, the sample was filtered within a Büchner funnel, rinsed with deionised water and dried at 110° C. in an oven for at least 12 hours prior to such measurement.

Intra-Particle Intruded Specific Pore Volume (in $cm^3/g$)

The specific pore volume was measured using a mercury intrusion porosimetry measurement using a Micromeritics Autopore V 9620 mercury porosimeter having a maximum applied pressure of mercury 414 MPa (60 000 psi), equivalent to a Laplace throat diameter of 0.004 μm (~nm). The equilibration time used at each pressure step was 20 seconds. The sample material was sealed in a 5 cm³ chamber powder penetrometer for analysis. The data were corrected for mercury compression, penetrometer expansion and sample material compression using the software Pore-Comp (Gane, P. A. C., Kettle, J. P., Matthews, G. P. and Ridgway, C. J., "Void Space Structure of Compressible Polymer Spheres and Consolidated Calcium Carbonate Paper-Coating Formulations", Industrial and Engineering Chemistry Research, 35(5), 1996, p1753-1764).

The total pore volume seen in the cumulative intrusion data can be separated into two regions with the intrusion data from 214 μm down to about 1-4 μm showing the coarse packing of the sample between any agglomerate structures contributing strongly. Below these diameters lies the fine inter-particle packing of the particles themselves. If they also have intra-particle pores, then this region appears bi-modal, and by taking the specific pore volume intruded by mercury into pores finer than the modal turning point, i.e. finer than the bi-modal point of inflection, the specific intra-particle pore volume is defined. The sum of these three regions gives the total overall pore volume of the powder, but depends strongly on the original sample compaction/settling of the powder at the coarse pore end of the distribution.

By taking the first derivative of the cumulative intrusion curve the pore size distributions based on equivalent Laplace diameter, inevitably including pore-shielding, are revealed. The differential curves clearly show the coarse agglomerate pore structure region, the inter-particle pore region and the intra-particle pore region, if present. Knowing the intra-particle pore diameter range it is possible to subtract the remainder inter-particle and inter-agglomerate pore volume from the total pore volume to deliver the desired pore volume of the internal pores alone in terms of the pore volume per unit mass (specific pore volume). The same principle of subtraction, of course, applies for isolating any of the other pore size regions of interest.

Bulk Density

100±0.5 g of the respective material were carefully filled through a powder funnel into the 250 mL measuring cylinder and the volume was read off to the nearest 1 mL. The loose bulk density was the calculated according the formula:

Loose bulk density [g/mL]=weighed sample [g]/bulk volume [mL] and the result was recorded to the nearest 0.01 g/mL.

Brookfield Viscosity

The Brookfield viscosity is measured by a Brookfield (type RVT) viscometer at 25° C.±1° C. at 100 rpm after 30 seconds using an appropriate spindle and is specified in mPa·s.

Weight Solids (wt.-%) of a Material in Suspension

The weight solids were determined by dividing the weight of the solid material by the total weight of the aqueous suspension. The weight of the solid material is determined by weighing the solid material obtained by evaporating the aqueous phase of the slurry and drying the obtained material to a constant weight.

Granule Stability and Granule Particle Size Distribution

A Malvern Mastersizer 3000 (Malvern Instruments Plc., Great Britain) in combination with Malvern Aero S dry dispersion unit and dry cell was used to determine the particle size distribution of the granules within the fineness range of $d_{50}$ of from 5 to 300 μm by means of laser diffraction. The methods used are described in the Mastersizer 3000 Basic Guide, Mastersizer 3000 Manual and the Manual for Aero Series Dry dispersion unit available by Malvern Instruments Ltd. Approximately 10 ml of sample was loaded into the Aero S through the corresponding sieve. The sample was measured dry. The results are expressed in V.-% (volume %). The feed rate was done at 0.1 bar, 0.5 bar, and 1.5 bar to show granule stability. The feed rate of 0.1 bar was used for determining the particle size distribution of the granules.

Scanning Electron Microscope (SEM)

The samples were prepared by diluting 50 to 150 μl slurry samples with 5 ml water. The amount of slurry sample depends on solids content, mean value of the particle size and particle size distribution. The diluted samples were filtrated by using a 0.8 μm membrane filter. A finer filter was used when the filtrate is turbid. A doubled-sided conductive adhesive tape was mounted on a SEM stub. This SEM stub was then slightly pressed in the still wet filter cake on the filter. The SEM stub was then sputtered with 8 nm Au. The investigation under the FESEM (Zeiss Sigma VP) was done at 5 kV (Au). Subsequently, the prepared samples were examined by using a Sigma VP field emission scanning electron microscope (Carl Zeiss AG, Germany) and a secondary electron detector (SE2) at high vacuum ($<10^{-2}$ Pa).

Mechanical Sieving

The mechanical sieving was carried out in a vibratory sieve shaker RETSCH AS200 equipped with Easy Sieve Software, sieves according to ISO 3310 incl. sieve pan and a balance (0.1 g). 120 g were used for sieving. The measured sample is made homogeneous to ensure the reproducibility of the sieving at a maximum. The measured sample material was put in the upper test sieve. The sieving was carried out with the following method: sieving time: 3 min/amplitude: 1.0/interval: 10 s.

2. Materials Used

Surface-Reacted Calcium Carbonate (SRCC1)

SRCC was obtained by preparing 350 litres of an aqueous suspension of ground calcium carbonate in a mixing vessel by adjusting the solids content of a ground limestone calcium carbonate from Omya SAS, Orgon having a weight based median particle size $d_{50}$(wt) of 1.3 μm, as determined by sedimentation, such that a solids content of 10 wt.-%, based on the total weight of the aqueous suspension, is obtained.

Whilst mixing the slurry at a speed of 6.2 m/s, 11.2 kg phosphoric acid was added in form of an aqueous solution containing 30 wt.-% phosphoric acid to said suspension over a period of 20 minutes at a temperature of 70° C. After the addition of the acid, the slurry was stirred for additional 5 minutes, before removing it from the vessel.

The slurry obtained (SRCC1) had a solids content of 25.7 wt.-%, based on the total weight of the slurry, and a Brookfield viscosity of 554 mPa·s.

The characteristics of the surface-reacted calcium carbonate are summarized in the following Table 1.

TABLE 1

| Bulk density [kg/L] | $d_{98}$(vol) [μm] | $d_{90}$(vol) [μm] | $d_{50}$(vol) [μm] | $d_{10}$(vol) [μm] | Intra particle intruded specific pore volume [cm³g⁻¹] (for the range 0.004 – d* [μm]) | d* [μm] |
|---|---|---|---|---|---|---|
| 1.193 | 8.8 | 6.9 | 3.9 | 2.1 | 0.869 | 0.8 |

Other Materials
Sodium croscarmellose-Ac-di-sol, from JRS

3. Homogenizing and Drying SRCC by Spray Drying

A. Homogenizing

SRCC2
The slurry of the surface-reacted calcium carbonate (SRCC1) was then diluted down to a solids content of about 20.1 wt.-%, based on the total weight of the slurry. Subsequently, 500 L of the slurry was pumped twice through the homogenizer GEA Ariete NS3055 of GEA Mechanical Equipment Italia S.p.A. at a pressure of 500 bar, a temperature of 50 to 70° C. and a feed flow of 400 L/h at closed screw position and small nozzle.

The slurry obtained (SRCC2) had a solids content of 23.4 wt.-%, based on the total weight of the slurry.

After 2 passes through the homogenizer, the surface-reacted calcium carbonate had the characteristics as set out in the following Table 2.

TABLE 2

| $d_{98}(vol)$ [μm] | $d_{90}(vol)$ [μm] | $d_{50}(vol)$ [μm] | $d_{10}(vol)$ [μm] | Intra particle intruded specific pore volume $[cm^3g^{-1}]$ (for the range 0.004-d* [μm]) | d* [μm] |
|---|---|---|---|---|---|
| 8.8 | 6.2 | 3.0 | 1.5 | 0.722 | 0.8 |

SRCC3

The slurry of the surface-reacted calcium carbonate (SRCC1) was diluted down to a solids content of about 18.9 wt.-%, based on the total weight of the slurry. Subsequently, 500 L of the slurry was pumped three times through the homogenizer GEA Ariete NS3055 of GEA Mechanical Equipment Italia S.p.A. at a pressure of 500 bar, a temperature of 50 to 70° C. and a feed flow of 400 L/h at closed screw position and small nozzle.

The slurry obtained (SRCC3) had a solids content of 18.9 wt.-%, based on the total weight of the slurry.

After 3 passes through the homogenizer, the surface-reacted calcium carbonate had the characteristics as set out in the following Table 3.

TABLE 3

| $d_{98}(vol)$ [μm] | $d_{90}(vol)$ [μm] | $d_{50}(vol)$ [μm] | $d_{10}(vol)$ [μm] | Intra particle intruded specific pore volume $[cm^3g^{-1}]$ (for the range 0.004-d* [μm]) | d* [μm] |
|---|---|---|---|---|---|
| 8.2 | 5.9 | 2.8 | 1.4 | 0.667 | 0.5 |

SRCC4

The slurry of the surface-reacted calcium carbonate (SRCC1) was mixed with sodium croscarmellose in an amount of 3 wt.-%, based on the total weight of the surface-reacted calcium carbonate (SRCC1), and then diluted down to a solids content of about 20.5 wt.-%, based on the total weight of the slurry. Subsequently, 500 L of the slurry was pumped twice through the homogenizer GEA Ariete NS3055 of GEA Mechanical Equipment Italia S.p.A. at a pressure of 500 bar, a temperature of 50 to 70° C. and a feed flow of 400 L/h at closed screw position and small nozzle.

The slurry obtained (SRCC4) had a solids content of 20.5 wt.-%, based on the total weight of the slurry.

After 2 passes through the homogenizer, the surface-reacted calcium carbonate had the characteristics as set out in the following Table 4.

TABLE 4

| $d_{98}(vol)$ [μm] | $d_{90}(vol)$ [μm] | $d_{50}(vol)$ [μm] | $d_{10}(vol)$ [μm] | Intra particle intruded specific pore volume $[cm^3g^{-1}]$ (for the range 0.004-d* [μm]) | d* [μm] |
|---|---|---|---|---|---|
| 145 | 87.2 | 4.3 | 1.8 | — | |

SRCC5

The slurry of the surface-reacted calcium carbonate (SRCC1) was diluted down to a solids content of about 20.1 wt.-%, based on the total weight of the slurry. Subsequently, the slurry was milled in a 25 L vertical stirred media mill of Siegmund Linder containing 33 kg silibeads ZY-E 0.4/0.6 mm at a feed flow of 82 L/h, a tip speed of 5.0 m/s and a specific energy of about 55 kWh/t.

The slurry obtained (SRCC5) had a solids content of 20.2 wt.-%, based on the total weight of the slurry.

After milling, the surface-reacted calcium carbonate had the characteristics as set out in the following Table 5.

TABLE 5

| $d_{98}(vol)$ [μm] | $d_{90}(vol)$ [μm] | $d_{50}(vol)$ [μm] | $d_{10}(vol)$ [μm] | Intra particle intruded specific pore volume $[cm^3g^{-1}]$ (for the range 0.004-d* [μm]) | d* [μm] |
|---|---|---|---|---|---|
| 5.8 | 4.10 | 1.65 | 0.063 | 0.868 | 0.83 |

SRCC6

The slurry of the surface-reacted calcium carbonate (SRCC1) was diluted down to a solids content of about 22.6 wt.-%, based on the total weight of the slurry. Subsequently, the slurry was milled in a 25 L vertical stirred media mill of Siegmund Linder containing 33 kg silibeads ZY-E 0.4/0.6 mm at a feed flow of 82 L/h, a tip speed of 5.0 m/s and a specific energy of about 55 kWh/t.

The slurry obtained (SRCC6) had a solids content of 22.9 wt.-%, based on the total weight of the slurry.

After milling, the surface-reacted calcium carbonate had the characteristics as set out in the following Table 6.

TABLE 6

| $d_{98}(vol)$ [μm] | $d_{90}(vol)$ [μm] | $d_{50}(vol)$ [μm] | $d_{10}(vol)$ [μm] | Intra particle intruded specific pore volume $[cm^3g^{-1}]$ (for the range 0.004-d* [μm]) | d* [μm] |
|---|---|---|---|---|---|
| 5.9 | 4.63 | 2.54 | 1.38 | 0.895 | 0.83 |

SRCC7

SRCC7 was obtained by preparing 350 litres of an aqueous suspension of ground calcium carbonate in a mixing vessel by adjusting the solids content of a ground limestone calcium carbonate from Omya SAS, Orgon having a weight based median particle size $d_{50}(wt)$ of 1.3 μm, as determined by sedimentation, such that a solids content of 10 wt.-%, based on the total weight of the aqueous suspension, is obtained.

Whilst mixing the slurry at a speed of 6.2 m/s, 11.2 kg phosphoric acid was added in form of an aqueous solution containing 30 wt.-% phosphoric acid to said suspension over a period of 20 minutes at a temperature of 70° C. After the addition of the acid, the slurry was stirred for additional 5 minutes, before removing it from the vessel.

The slurry obtained (SRCC7) had a solids content of 25.2 wt.-%, based on the total weight of the slurry, and a Brookfield viscosity of 365 mPa·s.

The characteristics of the surface-reacted calcium carbonate are summarized in the following Table 7.

TABLE 7

| Bulk density [kg/L] | d$_{98}$(vol) [μm] | d$_{90}$(vol) [μm] | d$_{50}$(vol) [μm] | d$_{10}$(vol) [μm] | Intra particle intruded specific pore volume [cm$^3$g$^{-1}$] (for the range 0.004 – d* [μm]) | d* [μm] |
|---|---|---|---|---|---|---|
| — | 9.2 | — | 3.9 | — | — | — |

SRCC8

A slurry of the surface-reacted calcium carbonate (SRCC7) was milled in a 200 L vertical stirred media mill of Siegmund Linder containing 250 kg silibeads ZY-E 0.4/0.6 mm at a feed flow of 1775 L/h, a tip speed of 10.0 m/s and a specific energy of about 65.8 kWh/t.

The slurry obtained (SRCC8) had a solids content of 21.7 wt.-%, based on the total weight of the slurry.

After milling, the surface-reacted calcium carbonate had the characteristics as set out in the following Table 8.

TABLE 8

| d$_{98}$(vol) [μm] | d$_{90}$(vol) [μm] | d$_{50}$(vol) [μm] | d$_{10}$(vol) [μm] | Intra particle intruded specific pore volume [cm$^3$g$^{-1}$] (for the range 0.004-d* [μm]) | d* [μm] |
|---|---|---|---|---|---|
| 5.3 | — | 1.75 | — | — | — |

SRCC9

A slurry of the surface-reacted calcium carbonate (SRCC7) was milled in a 200 L vertical stirred media mill of Siegmund Linder containing 250 kg silibeads ZY-E 0.4/0.6 mm at a feed flow of 2010 L/h, a tip speed of 10.0 m/s and a specific energy of about 58.1 kWh/t.

The slurry obtained (SRCC8) had a solids content of 20.1 wt.-%, based on the total weight of the slurry.

After milling, the surface-reacted calcium carbonate had the characteristics as set out in the following Table 9.

TABLE 9

| d$_{98}$(vol) [μm] | d$_{90}$(vol) [μm] | d$_{50}$(vol) [μm] | d$_{10}$(vol) [μm] | Intra particle intruded specific pore volume [cm$^3$g$^{-1}$] (for the range 0.004-d* [μm]) | d* [μm] |
|---|---|---|---|---|---|
| 5.2 | — | 1.67 | — | — | — |

B. Drying

The slurries obtained, i.e. SRCC1, SRCC2, SRCC3, SRCC4, SRCC5, SRCC6, SRCC8 and SRCC9 were than dried by removing the liquid from the slurries comprising the surface-reacted calcium carbonate by means of spray drying using a rotary atomizer, a bi-fluid nozzle or a fountain nozzle of GEA-Niro, Denmark.

The settings used for spray drying are set out in the following Table 10.

TABLE 10

| SRCC used | Solids content [wt.-%] | Device | Atomizer speed [%-rpm] | Nozzle configuration | Pressure [bar] |
|---|---|---|---|---|---|
| SRCC1 | 25.7 | rotary atomizer | 5-9660 | | Slurry*: 2.8 |
| | | bi-fluid nozzle | | 12.9/44/28 | Air: 1.05 Slurry*: 9.0 |
| | | fountain nozzle | | 1.7SE | Slurry: 14.5 |
| SRCC2 | 23.4 | rotary atomizer | 5-9660 | | Slurry*: 3.4 |
| | | bi-fluid nozzle | | 12.9/44/28 | Air: 2.53 Slurry*: 12.0 |
| | | | | 12.9/44/28 | Air: 1.50 Slurry*: 11.8 |
| | | | | 12.9/44/28 | Air: 1.30 Slurry*: 11.5 |
| | | fountain nozzle | | 1.7SF | Slurry*: 13.5 |
| SRCC3 | 18.9 | rotary atomizer | 5-9660 | | Slurry*: 3.1 |
| | | bi-fluid nozzle | | 12.9/44/28 | Air: 1.25 Slurry*: 11.5 |
| | | fountain nozzle | | 1.7SF | Slurry*: 13.0 |
| SRCC4 | 20.5 | rotary atomizer | 5-9660 | | Slurry*: 3.0 |
| | | bi-fluid nozzle | | 12.9/44/28 | Air: 1.25 Slurry*: 12.0 |
| | | fountain nozzle | | 1.7SF | Slurry*: 15.0 |
| SRCC5 | 20.3 | rotary atomizer | | | Slurry*: 3.6 |
| SRCC6 | 22.9 | rotary atomizer | | | Slurry*: 4.2 |
| SRCC8 | 21.7 | rotary atomizer | | | Slurry*: 4.4 |
| SRCC9 | 20.1 | rotary atomizer | | | Slurry*: 3.5 |

*refers to the pressure of the feed that goes to the drier

The results for the obtained granules are set out in the following Table 11.

TABLE 11

| Granules SRCC | Device | d$_{98}$(vol) [μm] | d$_{90}$(vol) [μm] | d$_{50}$(vol) [μm] | d$_{10}$(vol) [μm] | Intra particle intruded specific pore volume [cm$^3$g$^{-1}$] (for the range 0.004 – d* [μm]) | d* [μm] | density [g/mL] |
|---|---|---|---|---|---|---|---|---|
| Granules SRCC1 | rotary atomizer | 205 | 158 | 91.2 | 51.1 | 0.588 | 0.3 | 0.32 |
| | bi-fluid nozzle | 438 | 325 | 164 | 63.9 | 0.577 | 0.3 | 0.31 |

TABLE 11-continued

| Granules SRCC | Device | d$_{98}$(vol) [μm] | d$_{90}$(vol) [μm] | d$_{50}$(vol) [μm] | d$_{10}$(vol) [μm] | Intra particle intruded specific pore volume [cm$^3$g$^{-1}$] (for the range 0.004 – d* [μm]) | d* [μm] | density [g/mL] |
|---|---|---|---|---|---|---|---|---|
| | fountain nozzle | 340 | 271 | 168 | 101 | 0.602 | 0.3 | 0.31 |
| Granules SRCC2 | rotary atomizer | 162 | 125 | 72.3 | 40.8 | 0.681 | 0.8 | 0.51 |
| | bi-fluid nozzle | 150 | 106 | 52.5 | 27.0 | 0.698 | 0.9 | 0.49 |
| | fountain nozzle | 279 | 224 | 145 | 92.9 | — | — | 0.52 |
| Granules SRCC3 | rotary atomizer | 162 | 123 | 70.4 | 39.3 | 0.636 | 0.8 | 0.53 |
| | bi-fluid nozzle | 313 | 221 | 110 | 50.0 | 0.658 | 0.8 | 0.54 |
| | fountain nozzle | 285 | 226 | 139 | 83.5 | 0.647 | 0.4 | 0.57 |
| Granules SRCC4 | rotary atomizer | 176 | 135 | 76.7 | 41.5 | 0.683 | 0.8 | 0.58 |
| | bi-fluid nozzle | 293 | 210 | 106 | 49.0 | 0.712 | 0.9 | 0.49 |
| | fountain nozzle | 304 | 237 | 147 | 83.4 | 0.709 | 0.7 | m0.49 |
| Granules SRCC5 | rotary atomizer | 171 | 136 | 82 | 47.9 | 0.854 | 0.83 | 0.43 |
| Granules SRCC6 | rotary atomizer | 183 | 146 | 89.1 | 52.9 | 0.894 | 0.83 | 0.42 |
| Granules SRCC8 | rotary atomizer | 181 | 161 | 83.6 | 47.4 | — | — | 0.43 |
| Granules SRCC9 | rotary atomizer | 180 | 140 | 82.9 | 47.1 | — | — | 0.44 |

*refers to the pressure of the feed that goes to the drier

Figure 5:
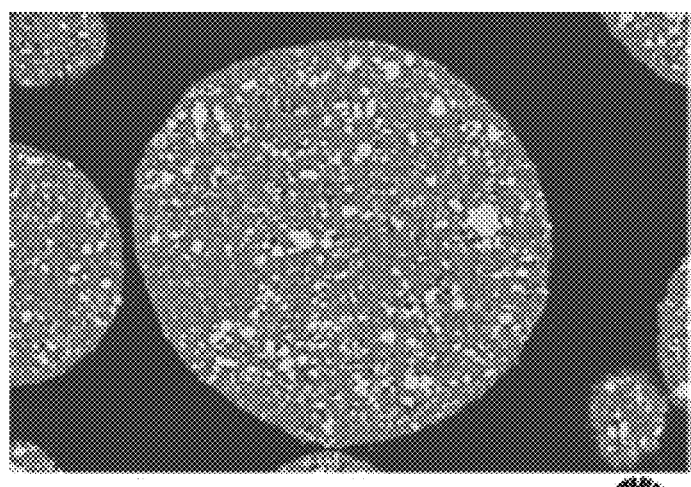
FIG. 5 further shows the SEM results for a cross-section through the granules obtained for SRCC2 by spray drying in a fountain nozzle.
Figure 6:
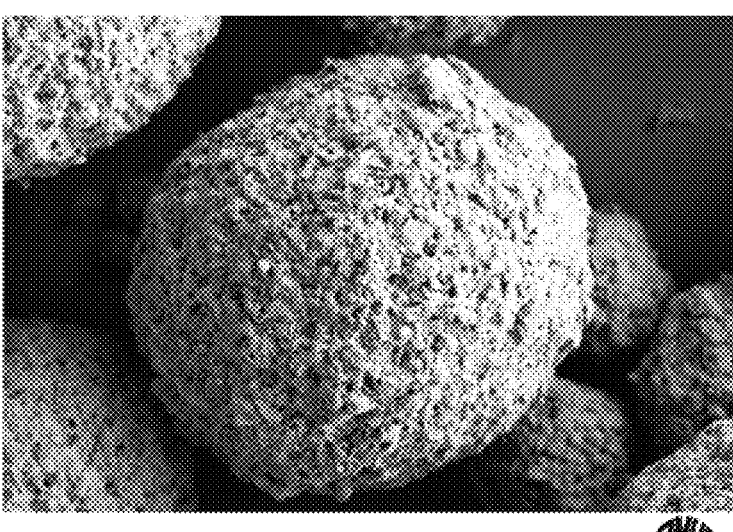
FIG. 6 shows the SEM results for the granules obtained for SRCC5 by using a mill for homogenizing and a rotary atomizer for spray drying.
Figure 7:
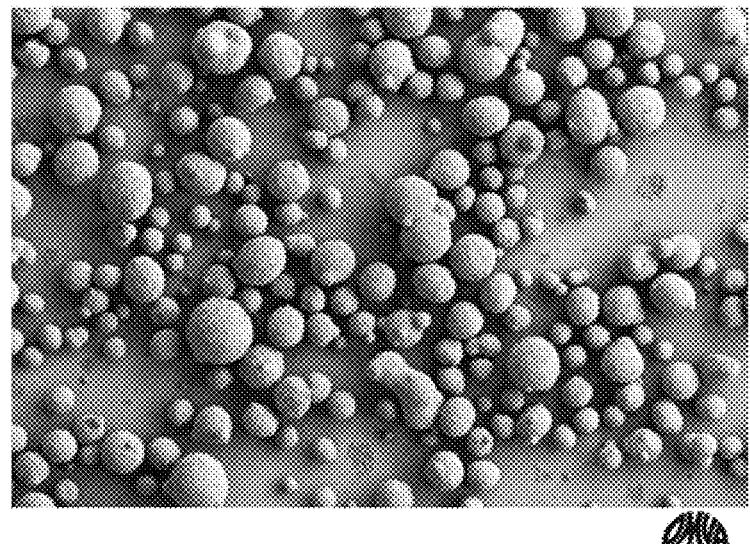
FIG. 7 shows the SEM results for the granules obtained for SRCC6 by using a mill for homogenizing and a rotary atomizer for spray drying.

The following table 12 summarizes the granule stability determined by the ratio d$_{50}$ and d$_{10}$ for (0.5 bar) vs. (0.1 bar) and for (1.5 bar) vs. (0.1 bar). From table 12, it can be gathered that granules prepared by a method comprising a step of homogenizing the aqueous suspension comprising the surface-reacted calcium carbonate, i.e. Granules SRCC2, Granules SRCC3, Granules SRCC4, Granules SRCC5, Granules SRCC6, Granules SRCC8 and Granules SRCC9, are more stable compared to granules obtained by the same method but missing the step of homogenizing the aqueous suspension comprising the surface-reacted calcium carbonate, i.e. Granules SRCC1. Furthermore, FIGS. 1 to 4 show a comparison of the SEM results for granules obtained by homogenizing in a homogenizer and by spray drying in a fountain nozzle, i.e. Granules SRCC1, Granules SRCC2, Granules SRCC3, and Granules SRCC4. It is to be noted that the SEM results for the granules obtained by spray drying in a rotary atomizer or bi-fluid nozzle are similar. FIG. 5 further shows a cross-section through the granules obtained by spray drying in a fountain nozzle, i.e. Granules SRCC2. FIGS. 6 and 7 show a comparison of the SEM results for granules obtained by homogenizing in a mill and by spray drying in a rotary atomizer, i.e. Granules SRCC5 and Granules SRCC6. It is to be noted that the SEM results for the granules obtained by spray drying in a fountain nozzle or bi-fluid nozzle are similar. Furthermore, it is to be noted that granules prepared by a step of homogenizing, which is carried out in an industrial scale, i.e. Granules SRCC8 and Granules SRCC9, show the same granule stability as granules prepared by a step of homogenizing, which is carried out in a lab scale, i.e. Granules SRCC2, Granules SRCC3, Granules SRCC4, Granules SRCC5 and Granules SRCC6. It is to be noted that samples after milling may be slightly inferior in physical data (friability/bulk density) but they are equal in performance.

TABLE 12

| Granules SRCC | Device | d$_{50}$(vol)* 0.5 bar vs 0.1 bar | d$_{10}$(vol)* 0.5 bar vs 0.1 bar | d$_{50}$(vol)* 1.5 bar vs 0.1 bar | d$_{10}$(vol)* 1.5 bar vs 0.1 bar |
|---|---|---|---|---|---|
| Granules SRCC1 | rotary atomizer | 22.7 | 36.8 | 6.4 | 23.7 |
| | bi-fluid nozzle | 7.4 | 50.0 | 4.7 | 38.0 |
| | fountain nozzle | 37.9 | 35.1 | 4.3 | 23.9 |
| Granules SRCC2 | rotary atomizer | 93.5 | 65.2 | 64.7 | 8.9 |
| | bi-fluid nozzle | 83.1 | 27.8 | 43.5 | 8.8 |
| | fountain nozzle | 82.9 | 42.6 | 38.6 | 18.3 |
| Granules SRCC3 | rotary atomizer | 86.6 | 36.8 | 52.4 | 7.3 |
| | bi-fluid nozzle | 90.8 | 56.6 | 62.1 | 6.5 |
| | fountain nozzle | 97.2 | 88.0 | 82.4 | 10.8 |
| Granules SRCC4 | rotary atomizer | 76.7 | 21.8 | 48.0 | 6.3 |
| | bi-fluid nozzle | 84.3 | 32.8 | 53.2 | 6.4 |
| | fountain nozzle | 91.8 | 56.7 | 74.1 | 7.9 |
| Granules SRCC5 | rotary atomizer | 94.9 | 69.1 | 70.2 | 6.8 |
| Granules SRCC6 | rotary atomizer | 91.6 | 45.6 | 65.8 | 5.7 |
| Granules SRCC8 | rotary atomizer | 92.0 | 44.6 | 68.7 | 8.3 |
| Granules SRCC9 | rotary atomizer | 89.3 | 48.3 | 66.8 | 7.2 |

*evaluated in a wet unit using a Malvern Mastersizer 3000 Laser Diffraction System (Malvern Instruments Plc., Great Britain)

The granules prepared according to the present invention were further analysed with regard to their compactability. For the testing, tablets were prepared in that the obtained granules of SRCC2, SRCC3, SRCC5 and SRCC6 were first mixed with croscarmellose in a Turbula Mixer (Willy A.

Bachofen, Turbula T10B) for 5 minutes. Subsequently, a lubricant (Magnesium stearate, Ligamed MF-2-V, Cas #557-04-0, Peter Greven) was added and the obtained mixture was again mixed in a Turbula Mixer (Willy A. Bachofen, Turbula T10B) for 5 minutes. Tablets of two comparative filler samples, one filler is based on tribasic calcium phosphate and the other one is based on dibasic calcium phosphate, were prepared the same way. Contrary thereto, the granules of SRCC4 were mixed with a lubricant (Magnesium stearate, Ligamed MF-2-V, Cas #557-04-0, Peter Greven) only in a Turbula Mixer (Willy A. Bachofen, Turbula T10B) for 5 minutes. The mixes were then used to prepare tablets in a Fette 1200i using EU1" tooling, a 10 mm fill cam, 8 standard convex round 10 mm punches and a tableting speed of 10 000 tablets/hour. The fill depth was adjusted to obtain compression forces of 2 kN up to 20 kN and the tablet weight was fixed at 160 mg. Tablets of two comparative filler samples, one filler is based on tribasic calcium phosphate and the other one is based on dibasic calcium phosphate, were prepared the same way.

The following Table 13 sets out the amounts [in wt. %] of the single ingredients in the tablets prepared.

TABLE 13

| | Ingredient/Amount [wt. %] | | |
| --- | --- | --- | --- |
| | Granules SRCC | Magnesium stearate | Sodium croscarmellose |
| Granules SRCC2 | 95 | 2 | 3 |
| Granules SRCC3 | 95 | 2 | 3 |
| Granules SRCC4 | 95 | 2 | 3 |
| Granules SRCC5 | 95 | 2 | 3 |
| Granules SRCC6 | 95 | 2 | 3 |
| tribasic calcium phosphate | 95 | 2 | 3 |
| dibasic calcium phosphate | 95 | 2 | 3 |

Figure 8:
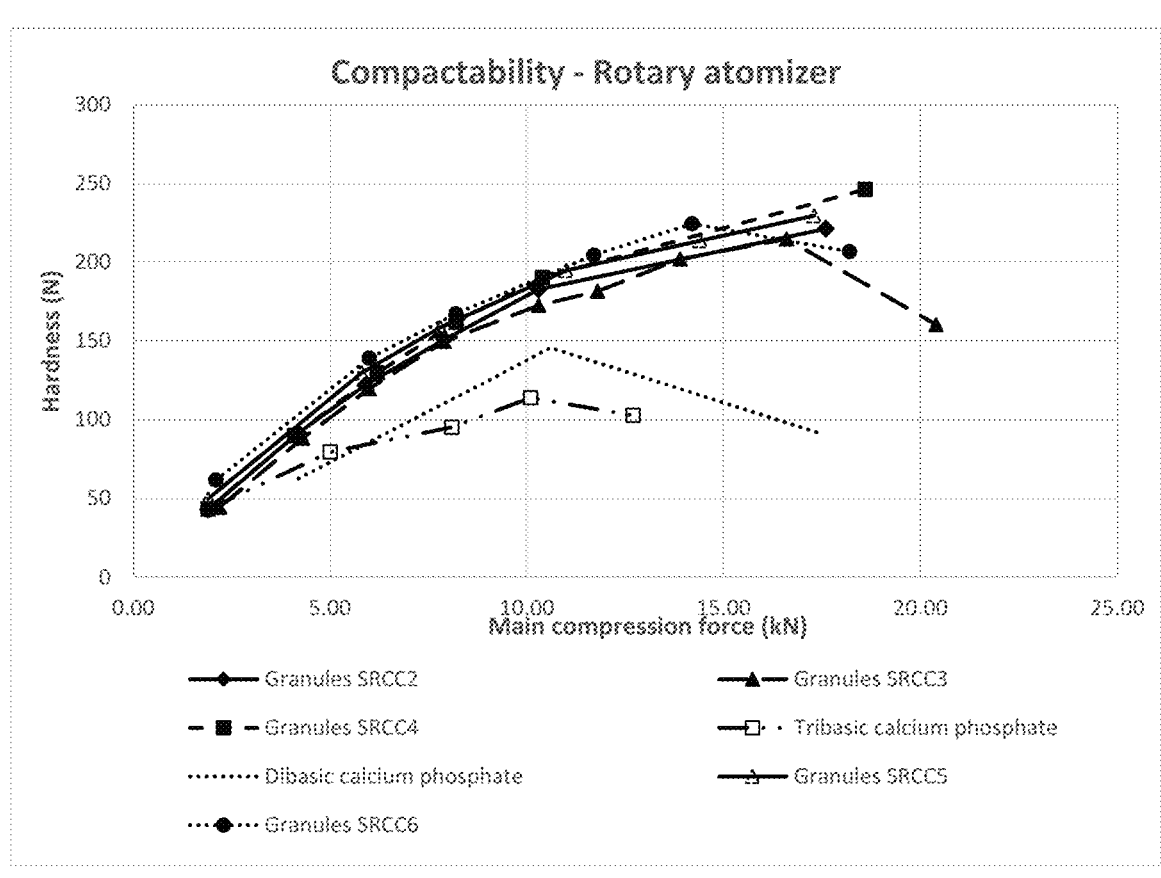
FIG. 8 shows the results for the tablet hardness [N] as a function of the main compression force [kN] for tablets prepared from the granules prepared according to the present invention by spray drying in a rotary atomizer compared to two commercial filler samples.

The tablet hardness [N] of the tablets as a function of the main compression force [kN] is shown in FIG. 8. FIG. 8 shows the results for tablets prepared from the granules prepared according to the present invention by spray drying in a rotary atomizer compared to two commercial filler samples, i.e. one filler is based on tribasic calcium phosphate and the other one is based on dibasic calcium phosphate. It can be gathered that the tablets prepared from the granules prepared according to the present invention shows a better relation of hardness versus main compression force and thus a better compactability compared to the commercial filler samples. It is to be noted that the compactability results for the granules obtained by spray drying in a fountain nozzle or bi-fluid nozzle are similar to the results obtained by spray drying in a rotary atomizer.

The granules prepared according to the present invention were further analysed with regard to their disintegration properties.

The disintegration time was determined by using a DisiT-est 50 Automatic Tablet Disintegration Tester of Pharmatron. For the testing, a beaker was filled with 700 mL tap water. The water was heated to 37.0° C., and then 6 tablets of each sample as prepared and described above were placed in a robust basket. The apparatus automatically detects and records the disintegration time. In addition, the disintegration time was also monitored visually.

Figure 9:
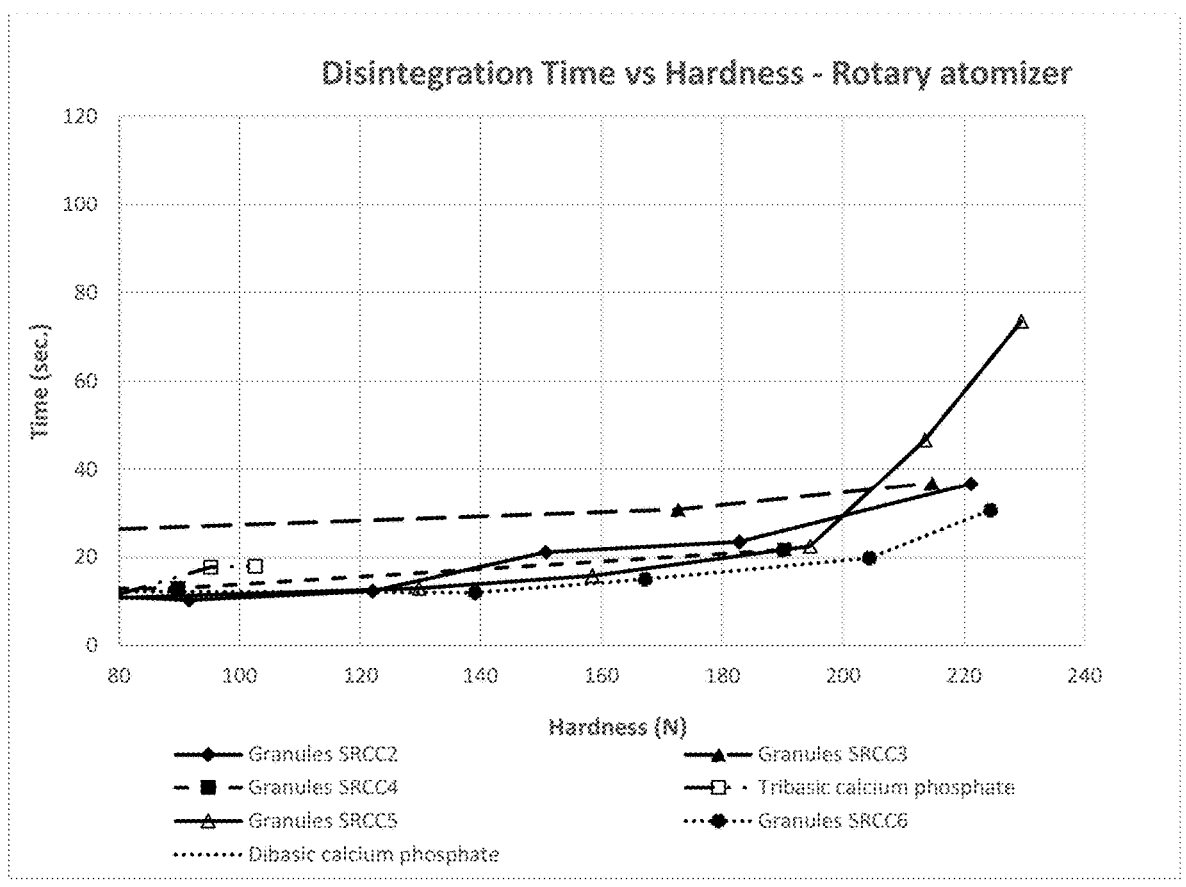
FIG. 9 shows the results for the disintegration time [sec] as a function of the tablet hardness [N] for tablets prepared from the granules prepared according to the present invention by spray drying in a rotary atomizer compared to the two commercial filler samples.

FIG. 9 shows the disintegration time [sec] as a function of the tablet hardness [N] for tablets prepared from the granules prepared according to the present invention by spray drying in a rotary atomizer compared to the two commercial filler samples, i.e. one filler is based on tribasic calcium phosphate and the other one is based on dibasic calcium phosphate. It can be gathered that the tablets prepared from the granules prepared according to the present invention show a favourable relation of disintegration time versus hardness. It is to be noted that the results of the relation of disintegration time versus hardness for the granules obtained by spray drying in a fountain nozzle or bi-fluid nozzle are similar to the results obtained by spray drying in a rotary atomizer.

The invention claimed is:

1. Granules comprising a surface-reacted calcium carbonate, wherein the surface-reacted calcium carbonate is a reaction product of natural ground or precipitated calcium carbonate with carbon dioxide and one or more acids, wherein the carbon dioxide is formed in situ by the acid treatment and/or is supplied from an external source, the granules having a bulk density ranging from 0.25 to 0.70 g/mL, and wherein the granules have a volume particle size $d_{90}$ of from 50 to 500 µm, a volume median particle size $d_{50}$ of from 5 to 300 µm, and a volume particle size $d_{10}$ of from 1 to 100 µm, as measured dry at 0.1 bar dispersion pressure by laser diffraction and a spherical shape.

2. The granules according to claim 1, wherein the granules comprise particles of surface-reacted calcium carbonate having
   a) a BET specific surface area of from 1 $m^2/g$ to 200 $m^2/g$, measured using nitrogen and the BET method according to ISO 9277:2010, and/or
   b) a volume median grain diameter $d_{50}$ of from 0.5 to 50 µm, measured by using laser diffraction, and/or
   c) an intra-particle intruded specific pore volume within the range from 0.15 to 1.60 $cm^3/g$, calculated from a mercury intrusion porosimetry measurement.

3. The granules according to claim 1, wherein the granules comprise at least one disintegrant.

4. The granules according to claim 3, wherein the granules comprise the at least one disintegrant in an amount ranging from 0.25 to 35 wt.-%, based on the total dry weight of the granules.

5. The granules according to claim 1, wherein the granules are obtained by a method comprising the steps of:
   a) providing an aqueous suspension comprising a surface-reacted calcium carbonate, wherein the surface-reacted calcium carbonate is a reaction product of natural ground or precipitated calcium carbonate with carbon dioxide and one or more acids, wherein the carbon dioxide is formed in situ by the acid treatment and/or is supplied from an external source;
   b) homogenizing the aqueous suspension comprising a surface-reacted calcium carbonate of step a), and
   c) removing the liquid from the aqueous suspension comprising a surface-reacted calcium carbonate of step b) by means of spray drying for obtaining granules comprising surface-reacted calcium carbonate.

6. A nutraceutical product, agricultural product, veterinary product, cosmetic product, home product, food product, packaging product, personal care product, or pharmaceutical product comprising the granules according to claim 1.

7. The granules according to claim 3, wherein the at least one disintegrant is selected from the group comprising sodium croscarmellose, modified cellulose gums, insoluble cross-linked polyvinylpyrrolidones, starches, modified starches, starch glycolates, micro crystalline cellulose, pregelatinized starch, sodium carboxymethyl starch, low-substituted hydroxypropyl cellulose, homopolymers of N-vinyl-2-pyrrolidone, alkyl-, hydroxyalkyl-, carboxyalkyl-cellulose esters, alginic acid, microcrystalline cellulose and its polymorphic forms, ion exchange resins, gums, chitin, chitosan, clays, gellan gum, crosslinked polacrillin copolymers, agar, gelatine, dextrines, acrylic acid polymers, carboxymethylcellulose sodium/calcium, hydroxpropyl methyl cellulose phthalate, shellac, effervescent mixtures in combination with one or more acids, or mixtures thereof.

\* \* \* \* \*